United States Patent
Hausman, Jr. et al.

(10) Patent No.: US 12,489,309 B2
(45) Date of Patent: *Dec. 2, 2025

(54) SUPPLEMENTAL POWER SUPPLY FOR A BATTERY-POWERED DEVICE

(71) Applicant: Lutron Technology Company LLC, Coopersburg, PA (US)

(72) Inventors: Donald F. Hausman, Jr., New Tripoli, PA (US); Sean R. Pearson, Allentown, PA (US)

(73) Assignee: Lutron Technology Company LLC, Coopersburg, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/650,245

(22) Filed: Apr. 30, 2024

(65) Prior Publication Data

US 2024/0283282 A1 Aug. 22, 2024

Related U.S. Application Data

(63) Continuation of application No. 18/350,827, filed on Jul. 12, 2023, now Pat. No. 12,003,134, which is a (Continued)

(51) Int. Cl.
*H02J 50/20* (2016.01)
*E06B 9/38* (2006.01)
(Continued)

(52) U.S. Cl.
CPC ............ *H02J 7/345* (2013.01); *E06B 9/38* (2013.01); *H02J 3/381* (2013.01); *H02J 3/388* (2020.01);
(Continued)

(58) Field of Classification Search
CPC .. H02J 7/345; H02J 3/381; H02J 3/388; H02J 3/466; H02J 7/00; H02J 7/35; H02J 9/061;
(Continued)

(56) References Cited

U.S. PATENT DOCUMENTS 5,413,161 A * 5/1995 Corazzini ............... E05F 15/71
160/168.1 P
5,760,558 A 6/1998 Popat
(Continued)

FOREIGN PATENT DOCUMENTS

CN 103085665 A 5/2013
WO WO2017179158 A1 10/2017

OTHER PUBLICATIONS

Andreas Wacker, Supplying TPS61200 With a Single Solar Cell, Texas Instruments, Sep. 2011, 8 pages.
(Continued)

*Primary Examiner* — Rexford N Barnie
*Assistant Examiner* — Michael J Warmflash
(74) *Attorney, Agent, or Firm* — Michael S. Czarnecki; Glen R. Farbanish; Philip N. Smith

(57) ABSTRACT

A battery-powered device, such as a motorized window treatment, may provide power to an electrical load, such as a motor. The device may also include a control circuit and a communication circuit. In addition to the battery, the device may be configured to receive power from a supplemental power source, such as a solar cell or wireless RF power supply, through which to power the control and communication circuits. The device may include a voltage monitor and a switch to intelligently control whether the battery or the supplemental power source is powering the control and communication circuits.

18 Claims, 15 Drawing Sheets

Related U.S. Application Data continuation of application No. 17/552,664, filed on Dec. 16, 2021, now Pat. No. 11,742,691, which is a continuation of application No. 16/240,444, filed on Jan. 4, 2019, now Pat. No. 11,205,921.

(60) Provisional application No. 62/614,060, filed on Jan. 5, 2018.

(51) Int. Cl.

| | | |
|---|---|---|
| *H02J 3/38* | (2006.01) | |
| *H02J 3/46* | (2006.01) | |
| *H02J 7/00* | (2006.01) | |
| *H02J 7/34* | (2006.01) | |
| *H02J 7/35* | (2006.01) | |
| *H02J 9/06* | (2006.01) | |

(52) U.S. Cl.
CPC ............... *H02J 3/466* (2020.01); *H02J 7/00* (2013.01); *H02J 7/35* (2013.01); *H02J 9/061* (2013.01); *H02J 50/20* (2016.02); *H02J 2300/24* (2020.01)

(58) Field of Classification Search
CPC ......... H02J 50/20; H02J 2300/24; E06B 9/38; Y02E 10/56
See application file for complete search history.

(56) References Cited

U.S. PATENT DOCUMENTS

| | | | | |
|---|---|---|---|---|
| 6,105,318 | A | 8/2000 | Harrison | |
| 6,353,520 | B1* | 3/2002 | Andresen | H10D 89/601 361/56 |
| 6,369,530 | B2* | 4/2002 | Kovach | E06B 9/32 388/933 |
| 6,781,335 | B2* | 8/2004 | Osinga | E04F 10/0659 318/445 |
| 6,812,662 | B1* | 11/2004 | Walker | E06B 9/322 160/310 |
| 7,389,806 | B2* | 6/2008 | Kates | E06B 9/68 160/310 |
| 7,401,634 | B2* | 7/2008 | Kovach | E06B 9/32 160/188 |
| 7,466,090 | B2* | 12/2008 | Meewis | E06B 9/322 160/84.02 |
| 7,472,739 | B2 | 1/2009 | Heidenreich | |
| 7,576,282 | B2 | 8/2009 | Heidenreich | |
| 7,617,857 | B2 | 11/2009 | Froese | |
| 7,719,215 | B2* | 5/2010 | Meewis | E06B 9/322 160/84.05 |
| 8,120,501 | B2 | 2/2012 | Mancini | |
| 8,365,800 | B2 | 2/2013 | Oh et al. | |
| 8,632,034 | B2 | 1/2014 | Mitchell et al. | |
| 8,917,039 | B2* | 12/2014 | Yugo | B60L 58/20 318/34 |
| 11,205,921 | B2* | 12/2021 | Hausman, Jr. | H02J 3/388 |
| 12,003,134 | B2* | 6/2024 | Hausman, Jr. | H02J 3/388 |
| 2008/0236763 | A1 | 10/2008 | Kates | |
| 2008/0260363 | A1* | 10/2008 | Carmen | H02P 7/29 388/811 |
| 2009/0059574 | A1 | 3/2009 | Lewis et al. | |
| 2009/0199975 | A1* | 8/2009 | Yeh | E06B 9/262 160/310 |
| 2009/0308543 | A1* | 12/2009 | Kates | E06B 9/72 160/310 |
| 2010/0307554 | A1 | 12/2010 | Migliozzi | |
| 2012/0261078 | A1* | 10/2012 | Adams | H04W 52/0245 160/331 |
| 2013/0106320 | A1* | 5/2013 | Yugo | B60L 58/14 318/139 |
| 2015/0226001 | A1* | 8/2015 | Adams | E06B 9/32 160/84.02 |
| 2016/0090052 | A1* | 3/2016 | Nishijima | B60L 58/20 307/9.1 |
| 2017/0288468 | A1* | 10/2017 | Pearson | H02J 50/20 |
| 2018/0202224 | A1* | 7/2018 | Kumar | E06B 9/42 |

OTHER PUBLICATIONS

Julie Jacobson, SI's Launch of the Decade: Motorized Shades Like None Other. SEPro, Sep. 1, 2017, 7 pages, accessed Feb. 26, 2018, "https://www.cepro.com/article/cedia_2017_screen_innovations_motorized_shades_rechargeable_battery".

\* cited by examiner

SUPPLEMENTAL POWER SUPPLY FOR A BATTERY-POWERED DEVICE

CROSS-REFERENCE TO RELATED APPLICATIONS

This application is a continuation of U.S. patent application Ser. No. 18/350,827, filed Jul. 12, 2023; which is a continuation of U.S. patent application Ser. No. 17/552,664, filed Dec. 16, 2021, now U.S. Pat. No. 11,742,691 issued Aug. 29, 2023; which is a continuation of U.S. patent application Ser. No. 16/240,444, filed Jan. 4, 2019, now U.S. Pat. No. 11,205,921 issued Dec. 21, 2021; all of which claim the benefit of U.S. Provisional Patent Application No. 62/614,060, filed Jan. 5, 2018, the entire disclosures of which are hereby incorporated by reference herein.

BACKGROUND

A control device may include control and communication circuitry, such as wireless communication circuitry, for receiving control instructions from an external device or network to control the control device. The control device may also include one or more batteries for powering electrical circuitry of the control device, for example, the control and communication circuitry. The batteries may also be used to power other electrical circuits associated with the control device, for example, a motor, light-emitting diode indicators, etc. The battery lifetime of the control device may primarily depend on how frequently the other electrical circuits of the control device are used. For electrical circuits of control devices that are used infrequently (e.g., once or twice per day), the power drain of control and communication circuitry may contribute to a significant portion of the battery energy usage since the communication circuitry may need to periodically check for new control instructions. For example, a motorized window treatment may only raise and/or lower a shade fabric once or twice per day, but the control and communication circuitry may consume power periodically throughout the entire day as the communication circuitry checks for new control instructions and wakes up the control circuit when control instructions are received. In some cases, the control and communication circuitry may use up to 50% or more of the battery capacity over the lifetime of the batteries, even with the use of energy consumption mitigation techniques, such as low-power sleep mode for the control and communication circuitry.

To extend battery life, battery-powered control devices may rely on photovoltaics to charge rechargeable batteries using solar energy. However, rechargeable batteries typically have limited cycling lifetimes. Additionally, solar charging methods are not optimal for rechargeable batteries, which further limits cycling lifetimes. Therefore, an alternative supplemental power supply for a battery-powered wireless device is needed.

FIG. 1 is a simplified block diagram of an example prior art motor supply drive circuit 100 that may be situated in a space, such as a room. The motor supply drive circuit 100 may contain a motor 106, which may be used to control the position of a covering material (e.g., a fabric) of a motorized window treatment (not shown) based on control instructions from a control and communication circuit 108. The control and communication circuit 108 may receive wireless control instructions from an external control device (not shown) via a network for example. The motor 106 may draw supply voltage $V_{CC1}$, supplied by a rechargeable battery 104, to control the position of the fabric of the motorized window treatment based on the received control instructions. For example, the rechargeable battery 104 may supply 12 volts (V) to the motor 106.

The control and communication circuit 108 may receive power from the rechargeable battery 104 through a power supply (e.g., a buck converter circuit 110). The buck converter circuit 110 may generate a supply voltage $V_{CC2}$. The buck converter circuit 110 may reduce the battery voltage $V_{CC1}$ to a magnitude suitable to power the control circuitry. For example, the buck converter circuit 110 may reduce the battery voltage $V_{CC1}$ received from the rechargeable battery from 12V to 3V to power the control circuit 108.

The rechargeable battery 104 may be charged externally through a wired connection, such as power supply connected to an AC wall outlet for example, or alternatively, through a solar cell 102. The solar cell 102 may harvest light energy from light external to the space (e.g., from daylight), and/or the solar cell 102 may harvest light energy from light internal to the space (e.g., from the artificial lights).

While the light energy harvested by the solar cell may be used to extend the battery life by charging the rechargeable battery 104, this configuration may have several disadvantages. First, rechargeable batteries may not be optimally suited for being charged by photovoltaics. The nature of solar cell energy generation, which is produced as a trickle charge of current, may reduce the useable lifetime of the rechargeable battery. Secondly, rechargeable batteries are more costly than traditional single-use batteries.

SUMMARY

In one aspect, the present disclosure relates to a supplemental power supply for a battery-powered load control device and to a method of supplying power to the load control device from the supplemental power supply which increases the battery life. The supplemental power supply may be based on renewable but unreliable energy sources such as electromagnetic, acoustic, mechanical, thermal, or other types of sources. The supplemental power supply may provide power just to the control circuit and communication circuits for example, while the battery provides power to a larger transient load. While the embodiments herein specifically describe motorized window treatments, one skilled in the art will recognize that the supplemental power supply described herein may be applied generally to any battery-powered load control device in order to increase the battery lifetime.

DETAILED DESCRIPTION

As described herein, a load control device may receive power from a first, or primary power source, such as a battery, and deliver power derived from the primary source to power one or more electrical loads. The load control device may be further configured to receive power from a second, or supplemental power source. The load control device may be configured such that the supplemental power source is an optional power source. For example, the supplemental power source may be externally connected to the load control device. Alternatively, the load control device may be configured such that the supplemental power source is integrated with the load control device.

Figure 1:
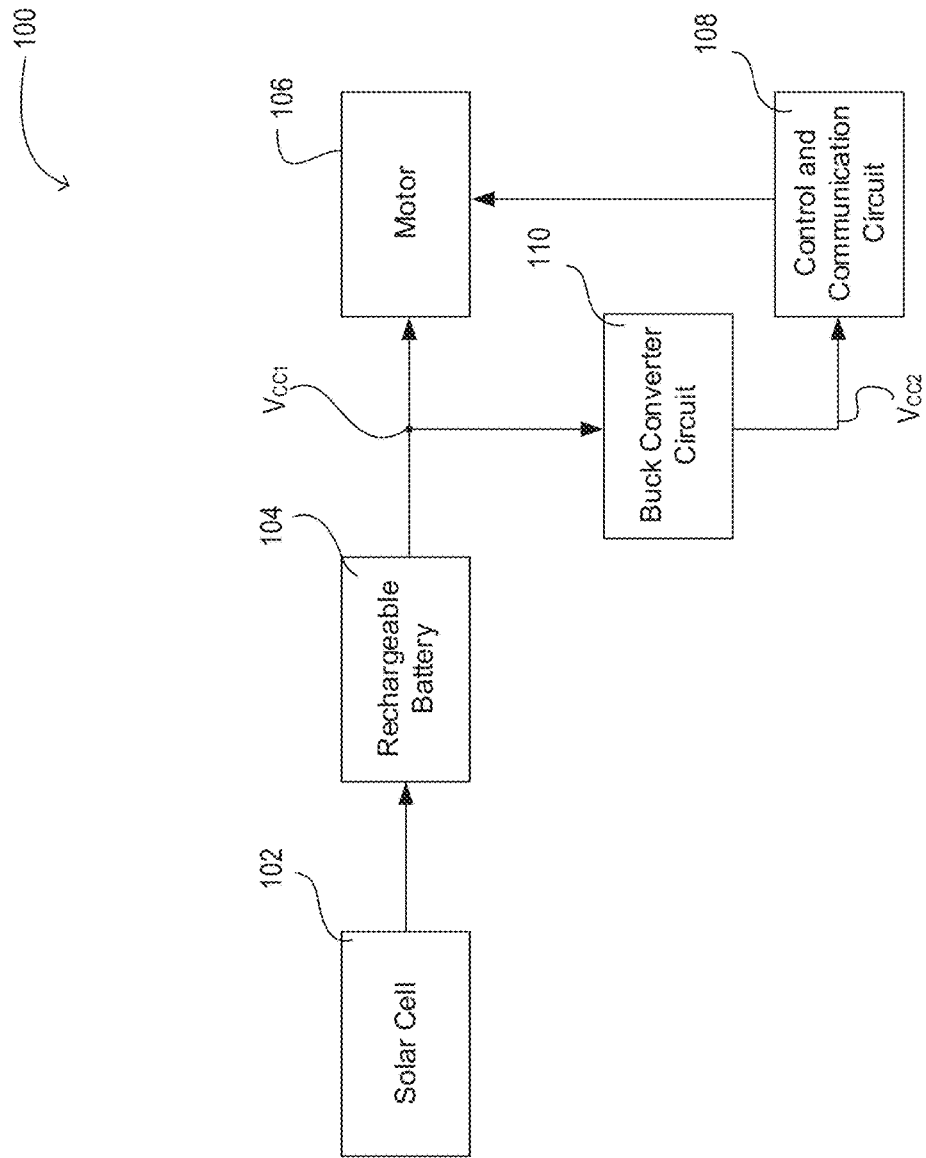
FIG. 1 shows a block diagram of an example prior art motor supply drive with a rechargeable battery and solar cell.
Figure 2:
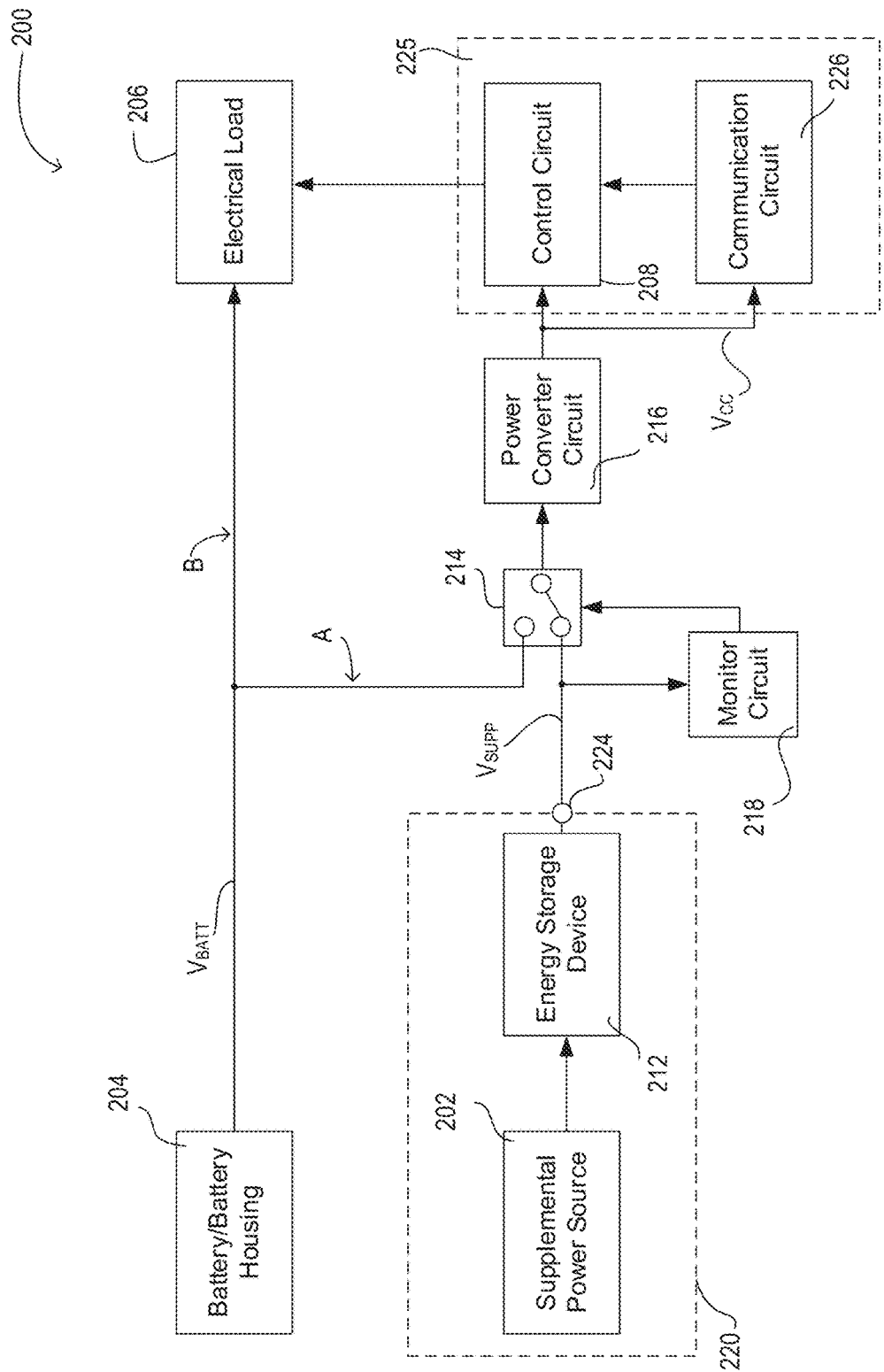
FIG. 2 shows a block diagram of an example device with a battery and supplemental power source.

FIG. 2 is a block diagram of an example device 200. Device 200 may include at least a first electrical load 206 and a second electrical load 225. The second electrical load 225 may include a control circuit 208 and/or a communication circuit 226, although one will recognize it may include fewer and/or additional and/or other circuit components. As one example, the second electrical load may operate at power voltage(s) lower than that of the first electrical load. In this respect, the second electrical load may be referred to herein as low voltage circuitry. As one example, device 200 may be a load control device and in particular, may be configured as a motor supply drive circuit. In this configuration, the electrical load 206 may include one or more motors and corresponding motor supply drive circuitry. The motor 206 may be coupled to a roller tube or a drive shaft (not shown) of a motorized window treatment for controlling the position of a covering material (e.g., a fabric) of the motorized window treatment. For example, the motor may be a direct-current (DC) motor, which may operate at a DC motor voltage of 12 volts (V). Typical DC motor voltages may be in the range of 9V to 24V, although other voltages are possible. For purposes of description, device 200 will be described herein as a motor supply drive circuit that includes a motor as electrical load 206 that is configured to control a motorized window treatment. Nonetheless, electrical load 206 may be a load different from a motor, for example, electrical load 206 may include one or more electrical loads, and device 200 may be a device other than a motor supply drive circuit. For example, the electrical load 206 may be a sensor circuit, such as an occupancy sensor, ambient light sensor, accelerometer, etc. Although the motor 206 and electrical load 225 are shown as part of device 200, one will understand that motor 206 and/or electrical load 225 do need not be part of device 200 but may be external to the device 200.

The control circuit 208 may control an amount of power provided to the electrical load 206, i.e., the motor. The motor (electrical load 206) of device 200 may control or adjust the position of the covering material of the motorized window treatment in response to one or more control signals received from the control circuit 208. The control circuit 208 may include one or more of a processor(s) (e.g., a microprocessor (s)), a microcontroller(s), a programmable logic device(s) (PLD), a field programmable gate array(s) (FPGA), an application specific integrated circuit(s) (ASIC), or any suitable processing device or combination thereof. The second electrical load 225 of device 200 may also include one or more memory modules ("memory") (not shown), including volatile and/or non-volatile memory modules, that may include non-removable memory modules and/or a removable memory module. The memory may be communicatively coupled to the control circuit 208. Non-removable memory may include random-access memory (RAM), read-only memory (ROM), a hard disk, or any other type of non-removable memory storage. Removable memory may include a subscriber identity module (SIM) card, a memory stick, a memory card, or any other type of removable memory. The memory may store one or more software based control applications that include instructions that may be executed by the control circuit 208. The control circuit 208, when executing such instructions, may perform signal coding, data processing, power control, input/output processing, and/or any other functionality that enables the control circuit 208 to perform as described herein.

The control circuit 208 may receive messages from the communication circuit 226. The communication circuit 226 may be a wired and/or a wireless communication circuit. For example, the communication circuit 226 may include a radio-frequency (RF) transceiver coupled to an antenna for transmitting and/or receiving RF signals. The communication circuit 226 may communicate via a Wi-Fi communication link, a Wi-MAX communications link, a Bluetooth® communications link, a ZigBee® link, a near field communication (NFC) link, a cellular communications link, a television white space (TVWS) communication link, a proprietary protocol (e.g., the ClearConnect® protocol), or any combination thereof. The communication circuit 226 may receive messages from an external control device (e.g., a remote control device) via any of these protocols described herein.

The communication circuit 226 may be operatively connected to the control circuit 208. The control circuit 208 may generate control signals for controlling the motor 206 based on the received messages. For example, the communication circuit 226 may receive messages from the external control device. The messages may be received by the communication circuit 226 through a wired or wireless communication link. For example, a remote control device may wirelessly send a command message to raise the fabric of the motorized window treatment to the communication circuit 226, and the control circuit 208 may control the motor 206 to raise or lower the fabric based on the received command. As another example, the control circuit may execute instructions (e.g., a timeclock schedule) and control the motor 206 to raise or lower the fabric independently of received messages via communications circuit 226.

Although communications have been described as a function of the communication circuit 226, one skilled in the art will readily understand that the communication circuit may alternatively and/or additionally be integrated with the control circuit to achieve the same effect.

The first electrical load/motor 206, and the second electrical load 225 consisting of the communication circuit 226 and the control circuit 208, for example, may be powered by a battery 204 that provides a battery voltage $V_{BATT}$. The battery 204 may be a single-use battery. Alternatively, the battery 204 may be a rechargeable battery. The battery 204 may be a single battery or it may be a battery pack including multiple batteries connected in series, for example. The battery/batteries of the battery pack may be configured to provide sufficient voltage for powering the motor. For example, when battery 204 is a battery pack it may include eight D-cell batteries coupled in series to provide 12 volts to the motor. The device 200 may include a battery housing into which one or more batteries may be inserted or connected to.

The battery 204 may power the control circuit 208 and the communication circuit 226 of the second electrical load 225 through a controllable switch 214. The battery 204 may provide power to the second electrical load 225 when the controllable switch 214 is in a first position or first state. A power converter circuit 216, such as a buck converter circuit, may be placed in series between the control and communication circuits 208, 226 and the controllable switch 214, as shown. Alternatively, the power converter circuit 216, that is, a buck converter circuit, may be placed in series between the battery 204 and the switch 214 to reduce the battery voltage $V_{BATT}$ for providing power to the control circuit 208 and the communication circuit 226 (e.g., at location A in FIG. 2). For example, the battery voltage $V_{BATT}$ from the battery 204 may be 12 volts to run the motor 206, and the power converter circuit 216 may reduce the battery voltage $V_{BATT}$ to a lower DC supply voltage $V_{CC}$, such as 3 volts, to power the control circuit 208 and the communication circuit 226. The power converter circuit 216 may be a switching power supply or other suitable circuitry to down-regulate the voltage with a high efficiency of conversion. For example, chip TSP62120 manufactured by Texas Instruments is an example step-down converter chip with 96% efficiency that may be used. A linear regulator may alternatively be used to reduce the voltage; however, low power efficiency during the voltage conversion may shorten the battery life.

Alternatively, motor supply drive circuit 200 may not include power converter circuit 216 such that the battery voltage $V_{BATT}$ may be coupled directly to the control circuit 208 and the communication circuit 226 via switch 214. In this configuration, motor supply drive circuit 200 may include a boost circuit (not shown) though which the motor 206 may be supplied with voltage. The boost circuit may be coupled in series between the battery 204 and the motor 206 (e.g., at location B in FIG. 2). For example, the battery 204 may provide the battery voltage $V_{BATT}$ to the control circuit 208 and the communication circuit 226 at a low magnitude, and the boost circuit may generate a boosted voltage from the battery voltage $V_{BATT}$, where the boosted voltage has a magnitude appropriate to run the motor 206, e.g., 12V. The low magnitude of the battery voltage $V_{BATT}$ may be in the range of 1-5 volts. For example, the control and communication circuits 208, 226 may be powered by a low voltage of 3.3V. One will recognize that other configurations are possible.

Additionally, although not shown, one will understand that the device 200 may include one or more additional batteries, i.e., a backup battery, which may be used for running a date/time clock and/or the memory to maintain the memory in case of a failure of the primary power source (that is, battery voltage $V_{BATT}$ is insufficient to power the one or more electrical loads 206, 225).

The motor supply drive circuit 200 may additionally include a supplemental power supply 220. The supplemental power supply 220 may generate supplemental voltage $V_{SUPP}$ for powering the second electrical load 225, here the control circuit 208 and the communication circuit 226. The communication circuit 226 may periodically wakeup to look for control commands, and/or the control circuit 224 may run timers, etc., which may consume power from the supplemental power supply 220. The supplemental power supply 220 may alleviate the power draw burden of the control circuit 208 and the communication circuit 226 on the battery 204. In this way, the supplemental power supply 220 may substantially increase the lifetime of the battery 204. For example, if the battery 204 of the motor supply drive circuit 200 is a battery pack having eight D-cell batteries coupled in series and the motor supply drive circuit 200 lowers and raises a shade fabric that is three feet wide by five feet long twice a day, battery 204 may have a lifetime of approximately three years. If the same motor supply drive circuit 200 (e.g., having the same battery pack and operating under the same conditions) includes the supplemental power supply 220, the battery may have an extended lifetime of over seven years.

The supplemental power supply 220 may be connected to the motor supply drive circuit 200 via a terminal 224. The terminal 224 may be a circuit trace or a mechanical contact, such as a terminal block, wire connector, metal contact pad, or any other suitable mechanical contact mechanism. The supplemental power supply 220 may be integrated with the motor supply drive circuit 200 (e.g., in the same enclosure), or the supplemental power supply may be an additional power supply optionally provided to a user and installed externally to the motor supply drive circuit 200 by the user. The supplemental power supply 220 may be provided externally to the motor supply drive circuit 200 to reduce cost of the motor supply drive circuit for users who do not require the supplemental power source. When supplying power to the control circuit and the communication circuit, the supplemental power source may provide a sufficient amount of power for the control circuit to provide commands to the electrical load. For example, the control circuit may send one or more control commands to the electrical load 206, i.e., the motor, while the control circuit is powered by the supplemental power supply.

The supplemental power supply 220 may include a supplemental power source 202. The supplemental power supply 220 may additionally include an energy storage device 212. The energy storage device 212 may store energy provided by the supplemental power source 202, and provide the supplemental voltage $V_{SUPP}$. In one embodiment, the energy storage device 212 may be a super capacitor. For example, the super capacitor may be an electric double-layer capacitor (ELDC), an ultracapacitor, or a Goldcap. The supercapacitor may have a capacitance of several tens of farads in order to store sufficient charge from the supplemental power source 202. For example, the supercapacitor may have a capacitance of 50 farads (F) and may store, on average, 200 joules (J) of energy per day. One will recognize other examples are possible. For example, the energy storage device may be another type of capacitor, such as a tantalum or electrolytic capacitor; a rechargeable battery; or any other type of energy storage device.

The supplemental power source 202 may be a renewable power source. As a result, the supplemental supply voltage $V_{SUPP}$ generated by the supplemental power supply 220 may be unreliable. For example, the supplemental power source 202 may be one or more solar cell(s) or photovoltaic (PV) cell(s), that is, a PV module. The power provided by the PV cell(s) to charge the energy storage device 212 may depend on the intensity, frequency, and duration of light provided to the PV cell(s). For example, the PV cell(s) may not charge the energy storage device 212 at night after sunset.

The PV cell(s) may be made of amorphous or crystalline silicon, organic photovoltaic materials, or any other any suitable photovoltaic material. The PV cell(s) may be characterized by an optimal voltage at which power is transferred at a maximum efficiency. For example, a PV module constructed of six amorphous silicon cells with a total active area of approximately 34 mm by 142 mm may generate a current of 5 milliamperes (mA) with indirect sunlight when the cell is maintained with an output voltage of 5V.

As another and/or additional example, the supplemental power source 202 may be a wireless power supply. The wireless power supply may include a receiver such as an antenna which receives electromagnetic energy from a remotely located transmitter. For example, a power transmitter may be plugged into an electrical outlet and transmit power from the electrical outlet via a transmit antenna within the power transmitter. The wireless power supply may have a receive antenna corresponding to the transmit antenna which receives power from the power transmitter and stores the energy in the energy storage device 212. Wireless power supplies for motorized window treatments are described in more detail in U.S. patent application Ser. No. 15/471,991, filed Mar. 31, 2017, entitled "Wireless Power Supply for Electrical Devices", the entire disclosure of which is herein incorporated by reference. Other example wireless power supplies are possible.

As another and/or additional example, the supplemental power source 202 may be any other suitable receiver that receives energy from the environment and converts the energy to electrical power. For example, the supplemental power source 202 may receive electromagnetic, acoustic, mechanical, thermal, or other types of energy from the environment and harvests this energy to provide electrical power to charge the energy storage device 212.

Due to the unreliable nature of the supplemental power source 202 (e.g., if light is not present to power the PV cell(s)) and/or if the supplemental power supply 220 is an optional supply that may not installed to the motor supply drive circuit 200, the motor drive supply circuit 200 may include a monitor circuit 218 for monitoring and determining the magnitude of the supplemental supply voltage $V_{SUPP}$ before power may be provided to the control circuit 208 and the communication circuit 226 via connection 224 from the supplemental power supply 220. The supplemental supply voltage $V_{SUPP}$ provided by the supplemental power supply 220 may power the control circuit 208 and the communication circuit 226 through the controllable switch 214. When the supplemental power supply 220 is installed, the monitor circuit 218 may detect or determine whether the magnitude of the supplemental supply voltage $V_{SUPP}$ is a suitable magnitude to be coupled to the power converter circuit 216. When the monitor circuit 218 detects or determines that the magnitude of the supplemental supply voltage $V_{SUPP}$ is a suitable magnitude, it may control the switch 214 to the second position, thereby connecting the supplemental supply voltage $V_{SUPP}$ to the power converter circuit 216. The switch 214 may receive the control command from the monitor circuit 218 and the switch may then disconnect the battery voltage $V_{BATT}$ supplied by the battery 204 to the control circuit 208 and communication circuit 226 to allow the control circuit and communication circuit to be powered from the supplemental supply voltage $V_{SUPP}$ provided by the supplemental power supply 220.

When the monitor circuit 218 detects or determines that the magnitude of the supplemental supply voltage $V_{SUPP}$ is not a suitable magnitude (e.g., because the supplemental power supply 220 is not present or because the energy storage device 212 is not sufficiently charged), the monitor circuit 218 may control the switch 214 to connect the battery voltage $V_{BATT}$ from the battery 204 to the power converter circuit 216. The switch 214 may receive the control command from the monitor circuit 218 and the switch may then return to the first position (e.g., the first state), thereby disconnecting the supplemental supply voltage $V_{SUPP}$ supplied by the supplemental power supply 220 to the control circuit 208 and communication circuit 226 to allow the control circuit and communication circuit to be powered from the battery voltage $V_{BATT}$ provided by the battery 204.

As one example, the monitor circuit 218 may be a voltage monitor circuit. The monitor circuit 218 may monitor the supplemental supply voltage $V_{SUPP}$ using a comparator or other suitable analog circuitry. In the case where the power converter circuit 216 is located at location B (i.e., the battery 204 may directly power the electrical load 225), for example, the monitor circuit 218 may compare the magnitude of the supplemental supply voltage $V_{SUPP}$ with the magnitude of the battery voltage $V_{BATT}$ provided by the battery 204. When the magnitude of the supplemental supply voltage $V_{SUPP}$ is less than the magnitude of the battery voltage $V_{BATT}$ for example, the monitor circuit 218 may control the switch 214 such that the battery voltage $V_{BATT}$ from the battery 204 is provided to the control circuit 208 and communication circuit 226 (i.e., maintaining the switch 214 in the first position). When the magnitude of the supplemental supply voltage $V_{SUPP}$ is greater than or equal to the magnitude of the battery voltage $V_{BATT}$ or example, the monitor circuit 218 may control the switch 214 such that the supplemental supply voltage $V_{SUPP}$ from the supplemental power supply 220 is provided to the control circuit 208 and communication circuit 226. One will recognize that other configurations are possible. For example, when the power converter circuit 216 is located in position A of FIG. 2, the output of the power converter circuit 216 (as opposed to $V_{BATT}$) may be compared with $V_{SUPP}$.

According to another example, where the power converter circuit 216 is connected as shown in FIG. 2 between the switch 214 and the electrical load 225, the monitor circuit 218 may include a clamp circuit and a latch circuit. The monitor circuit 218 may operate to maintain the magnitude of the supplemental supply voltage $V_{SUPP}$ of the supplemental power supply 220 within a certain range. The monitor circuit 218 may maintain the input voltage to the power converter circuit 216 above a minimum threshold and/or below a maximum threshold. For example, the monitor circuit 218 may compare the magnitude of the supplemental supply voltage $V_{SUPP}$ to the minimum and maximum thresholds. When the monitor circuit 218 determines that the magnitude of the supplemental supply voltage $V_{SUPP}$ reaches and/or is above a maximum threshold, the latch circuit may engage, causing monitor circuit 218 to configure the switch 214 (e.g., turn the switch to the second state, or on state, i.e., to the second position) to provide power to the power converter circuit 216 from the supplemental power supply 220. The latch circuit may remain engaged until the magnitude of the supplemental supply voltage V SUPP reaches and/or falls below a minimum threshold, wherein the latch circuit of the monitor circuit 218 may disengage, thereby causing monitor circuit 218 to configure the switch 214 (e.g., turning the switch to the first state, or off state, i.e., to the first position) to provide power to the power converter circuit from the battery 204.

Additionally, when the monitor circuit 218 determines that the magnitude of the supplemental supply voltage $V_{SUPP}$ reaches and/or is above the maximum threshold, the clamp circuit of monitor circuit 218 may clamp the supplemental supply voltage $V_{SUPP}$ to not exceed the maximum threshold.

The maximum and minimum thresholds may be selected to ensure that the supplemental power source 202 operates in a region of maximum power transfer. For example, assuming the supplemental power source is an amorphous silicon solar cell as described above, it may operate most efficiently around 5V. Therefore, the maximum threshold may be set close to, for example 5V (e.g., 4.9V). When used in conjunction with a 50 farad supercapacitor for energy storage device 212, monitor circuit 218 may operate to ensure that the output voltage $V_{SUPP}$ of the supercapacitor does not drop below a minimum threshold of 4.2V, for example, to maximize the efficiency of the solar cell. If the output voltage drops below the minimum threshold, the monitor circuit 218 may control the switch 214 to power the control circuit 208 and the communication circuit 226 from the battery 204 (e.g., rather than the energy storage device 212).

Although the monitor circuit 218 has been described herein as a voltage monitor, one skilled in the art will recognize that other types of monitor circuits may be used. For example, a coulomb counter may alternatively be used as a monitor of current being supplied by the supplemental power supply 220.

The switch 214 may include an electronic switch or transistor, such as a field-effect transistor (FET) or bi-polar junction transistor (BJT).

Figure 3:
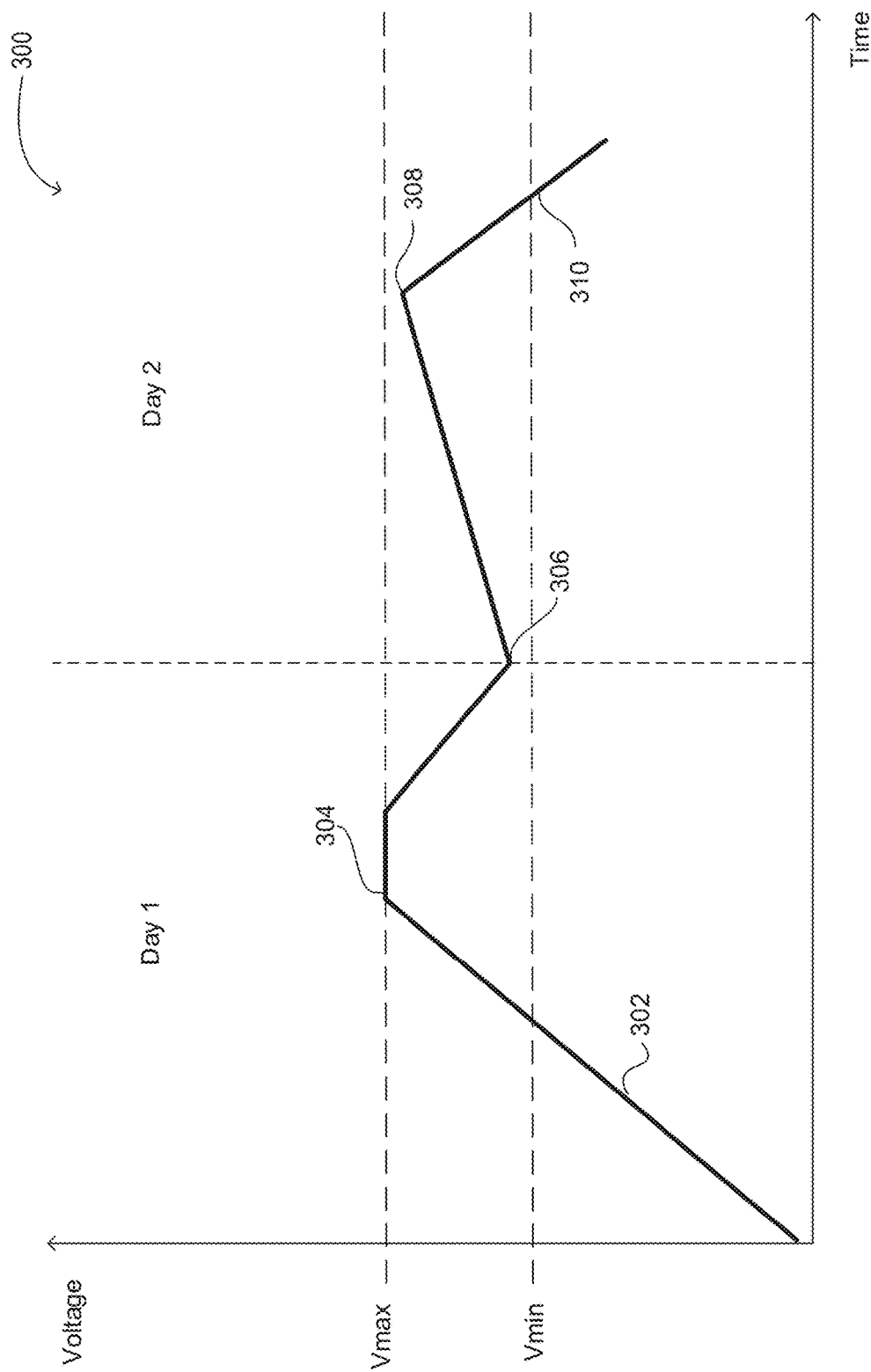
FIG. 3 is an example voltage profile over time of an energy storage device powered by a solar cell.

FIG. 3 is an example profile 300 of a magnitude of a supply voltage $V_{SUPP}$ developed across an energy storage device, such as a supercapacitor, over time when powered by a solar cell or photovoltaic cell. For example, the photovoltaic cell may provide a maximum power transfer to the energy storage device at a voltage around 5 volts. Deviations from this optimal voltage may cause decreased efficiency in energy transfer from the photovoltaic cell to the energy storage device 212. Therefore, the magnitude of the supply voltage $V_{SUPP}$ may be controlled by circuitry (e.g., the monitor circuit 218 and the switch 214) to maintain the magnitude of the supply voltage between a maximum threshold Vmax and a minimum threshold Vmin. The maximum and minimum voltage thresholds Vmax, Vmin may ensure that maximum power transfer from the photovoltaic cell to the energy storage device is achieved.

The photovoltaic cell may begin charging when sunlight, for example, is incident on the photovoltaic cell during the morning of Day 1, shown at 302. The current generated by the photovoltaic cell may begin charging the energy storage device 212. As described previously, according to this example when the voltage of the energy storage device reaches the maximum threshold Vmax (e.g., the maximum threshold as set by the monitor circuit 218) at 304, the monitor circuit 218 may latch and clamp the magnitude of the supply voltage at the maximum threshold Vmax. When the latch engages, the switch circuit 214 may change states to the second position to provide power from the energy storage device 212 to the power converter circuit 216, and the battery 204 may no longer provide current to the power converter circuit.

As the amount of sunlight begins to decrease at the end of Day 1, the magnitude of the supply voltage $V_{SUPP}$ on the energy storage device 212 may also decrease as shown at 306, as the power converter circuit 216 continues to draw power from the energy storage device. While the magnitude of the supply voltage on the energy storage device remains above the minimum threshold Vmin, the latch and switch may remain engaged, and the power converter circuit 216 may continue to receive power from the energy storage device.

During Day 2, as sunlight incident on the photovoltaic cell increases, the magnitude of the supply voltage $V_{SUPP}$ on the energy storage device 212 may reach a maximum level at 308. If it is cloudy outside, the magnitude of the supply voltage on the energy storage device may not reach the maximum threshold Vmax, and the clamp circuit may not engage. However, because the magnitude of the supply voltage is maintained above the minimum threshold Vmin, the latch circuit may still be engaged and the switch may continue to provide power from the energy storage device 212 to the power converter circuit. Therefore, the battery 204 may not provide power to the power converter circuit at this point 308.

As sunlight incident on the photovoltaic cell decreases, the energy storage device 212 may continue to discharge, and the magnitude of the supply voltage $V_{SUPP}$ on the energy storage device 212 may reach the minimum threshold at 310. According to this example, when the magnitude of the supply voltage $V_{SUPP}$ on the energy storage device 212 falls below the minimum threshold Vmin, the latch circuit of the monitor circuit 218 may unlatch, thereby causing the switch 214 to change state to the first position, thereby connecting the power converter circuit to the battery 204, and not the energy storage device 212.

The switch 214 may remain in this position (i.e., connecting the power converter circuit 216 to the battery 204) as the magnitude of the supply voltage $V_{SUPP}$ on the energy storage device 212 increases when the photovoltaic cell charges the energy storage device again. The switch 214 may not be coupled to provide power from the energy storage device 212 to the power converter circuit 216 until the magnitude of the supply voltage $V_{SUPP}$ on the energy storage device once again reaches, for example, the maximum threshold Vmax, thereby turning on the clamp and latch circuits and configuring the switch to supply power from the energy storage device 212.

During the majority of the lifetime of the device 200, the latch circuit may remain engaged and the switch 214 may provide power to the power converter circuit via the energy storage device 212. For example, the energy storage device may provide power to the power converter circuit over 95% of the lifetime of the device. The monitor circuit 218 may switch over to powering the power converter circuit by the battery 204 only after several days of low sunlight availability.

Figure 4:
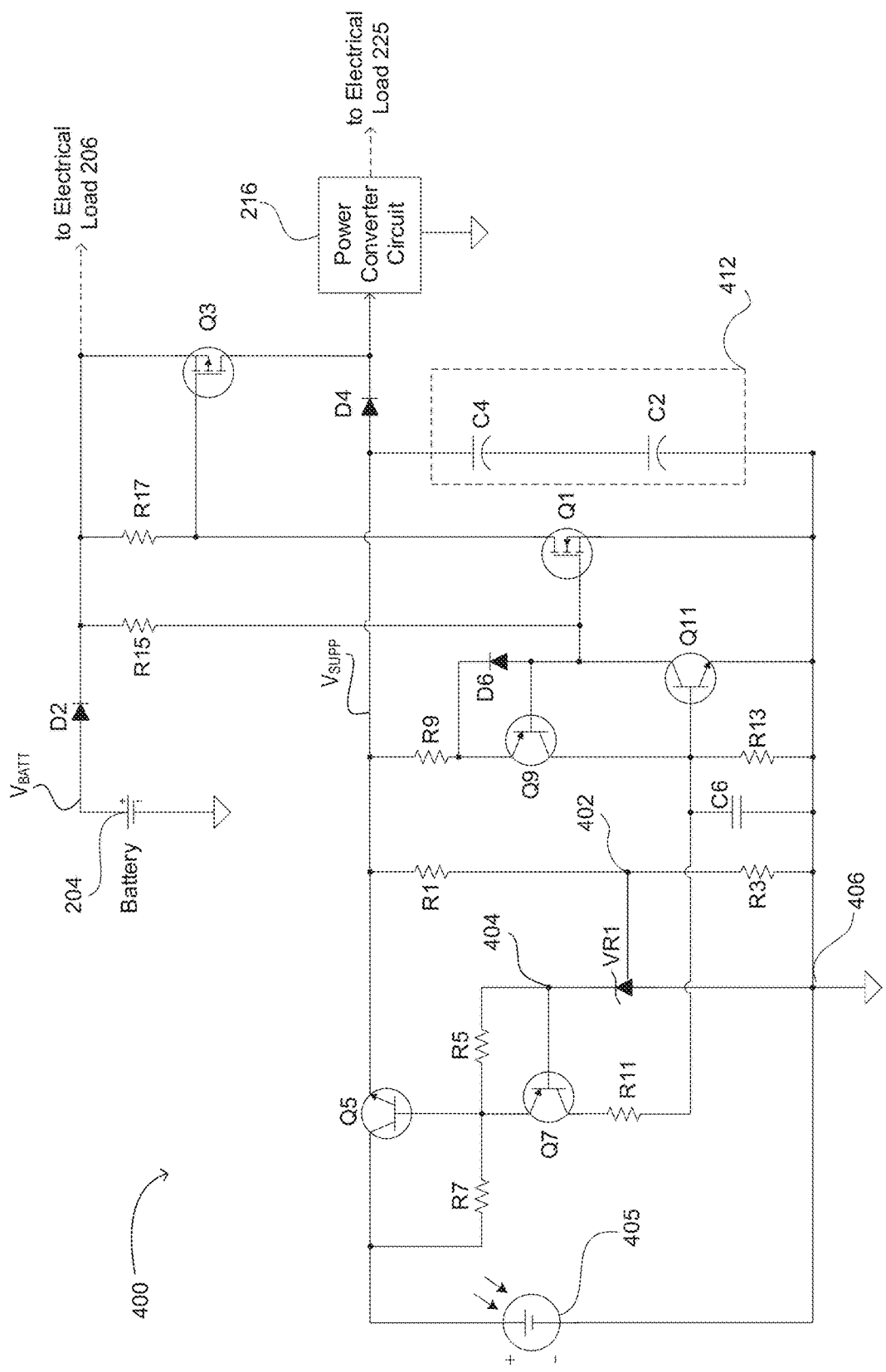
FIG. 4 is an example schematic of a voltage monitor and switch.

FIG. 4 shows a device 400 which is an example implementation of device 200 of FIG. 2 with the monitor circuit 218 (in this example a voltage monitor circuit) and switch 214 depicted in schematic form together with the battery 204. Device 400 further includes the components of FIG. 2 such as the supplemental power source 202 (shown in this example as photovoltaic cell 405), the energy storage device 212 (e.g., shown in this example as energy storage device 412 and consisting of supercapacitors C2, C4), the power converter circuit 216, and the first electrical load 206, and the second electrical load 225. The circuit shown may set the impedance for the photovoltaic cell 405. Voltage to the second electrical load 225 (e.g., control circuit 208, communication circuit 226, and/or other low voltage circuitry) is provided by the power converter circuit 216, which reduces the voltage from the battery 204 or energy storage device 412 to the appropriate level for powering the second electrical load 225 as described previously.

All voltages described in FIG. 4 are measured with reference to circuit common, shown as 406 in FIG. 4. The battery 204 may or may not provide voltage to the power converter circuit 216 based on the state of a p-channel metal oxide semiconductor field-effect transistor (PMOS FET) Q3. For example, the battery 204 may provide voltage to the power converter circuit 216 when FET Q3 is conductive. The FET Q3 may be rendered conductive to provide the battery voltage $V_{BATT}$ from the battery 204 when the energy storage device 412 does not have sufficient charge to provide power to the power converter circuit 216, e.g., when the magnitude of the supplemental supply voltage $V_{SUPP}$ stored by the energy storage device 412 is below a minimum threshold.

The photovoltaic cell 405 may generate a voltage and a current when exposed to light. When voltage is generated by the photovoltaic cell 405, an NPN bipolar junction transistor (BJT) Q5, for example, may begin to conduct current, charging the supercapacitors C2, C4. A resistor R7 may be placed between the collector and the base of the transistor Q5. In order for the transistor Q5 to conduct current through the collector-emitter junction (e.g., "turn on" the transistor), the resistance of a resistor R7 should be selected to be a sufficiently small value to cause the base-collector junction of the transistor Q5 to have only a small reverse bias, allowing the transistor Q5 to be self-driven. For example, the resistor R7 may have a value of about 700 ohms.

As the voltage generated by the photovoltaic cell increases and exceeds the maximum threshold Vmax, the clamp circuit comprised of, for example, a PNP bipolar junction transistor (BJT) Q7, an adjustable shunt regulator VR1, a resistor R1, and a resistor R3 of the voltage monitor circuit may act to throttle the current conducted through the transistor Q5. The clamp circuit may slow the rate of charge of the supercapacitors C2, C4 through the transistor Q5 by changing the impedance of Q5 and turning on the transistor Q7 to split the path of the current provided by the photovoltaic cell. The current through transistor Q7 may be limited by resistor R11, while the current through the adjustable shunt regulator VR1 may be primarily set by the voltage drop across the base-emitter junction of transistor Q7 (i.e., the voltage drop across resistor R5). Transistor Q5 may increase in impedance to allow the minimum current required to maintain the clamp voltage, thereby decreasing the output current from the photovoltaic cell 405 provided to supercapacitors C2, C4.

For example, as the voltage of the photovoltaic cell increases, the voltage developed across the resistors R1, R3 may also increase. The voltage at the junction 402 of the resistors R1 and R3 may set the reference voltage input provided to the adjustable shunt regulator VR1. The reference voltage input may set the breakdown voltage threshold of the adjustable shunt regulator VR1. The resistance values of the resistors R1, R3 may be selected to provide an appropriate breakdown voltage threshold at the junction 402 of the resistors R1, R3 for the adjustable shunt regulator VR1. For example, the breakdown voltage threshold may be 1.25 volts.

For example, the adjustable shunt regulator VR1 may be part number TLV431 manufactured by Texas Instruments. The adjustable shunt regulator VR1 may regulate the supplemental supply voltage $V_{SUPP}$ on the supercapacitors by controlling the current generated by the photovoltaic cell through the transistor Q5. When the photovoltaic cell voltage generated by the photovoltaic cell exceeds the maximum threshold, the voltage at the junction of R5 and VR1 may exceed the breakover voltage of the adjustable shunt regulator VR1, as set by the resistors R1 and R3 at node 402. The adjustable shunt regulator VR1 may then begin to conduct current from the base of the transistor Q7 to circuit common 406 while clamping the voltage to the maximum threshold. When the adjustable shunt regulator VR1 conducts current from the base of the transistor Q7, transistor Q7 may turn on and begin conducting current. The transistor Q7 may draw base current away from transistor Q5, causing Q5 to operate in a linear mode. When Q5 operates in a linear mode, the impedance between the collector-emitter may increase to limit the charging current from the photovoltaic cell to the supercapacitors, thereby clamping the voltage and maintaining the supplemental supply voltage at or below the maximum threshold Vmax. As the current through the transistor Q5 is reduced, the transistor Q5 may operate in its linear active region, providing a high impedance to the photovoltaic cell and reducing the current flow from the photovoltaic cell to charge the supercapacitors C2, C4.

When the transistor Q7 begins to conduct current, the current flow may trigger an NPN bipolar junction transistor Q11, for example, to also begin conducting current. The transistor Q11, together with, for example, a PNP bipolar junction transistor Q9, a resistor R9, a resistor R13, and a capacitor C6, may operate as a latch circuit. When the clamp circuit engages the latch circuit, the latch circuit may act to maintain Q3 in the off state until the voltage $V_{SUPP}$ on the supercapacitors C2, C4 falls below minimum threshold. When the voltage $V_{SUPP}$ on the supercapacitors C2, C4 falls below the minimum threshold, the latch circuit may turn on Q3, thereby removing the power draw from the supercapacitors to the power converter circuit 216.

The minimum threshold may be set to maintain a maximum power transfer from the photovoltaic cell 405 to the supercapacitors C2, C4 such that the supercapacitors may not discharge below the optimum maximum power transfer range. For example, the minimum threshold may be set to 4.2V. When the voltage on the supercapacitors C2, C4 exceeds a maximum threshold (for example, 4.9V), the latch circuit may be engaged through the clamp circuit described previously, where the adjustable shunt regulator VR1 turns on the transistor Q7 thereby triggering the transistor Q11 of the latch circuit.

The capacitor C6 may protect the latch circuit from noise and false latches. The capacitor C6 may have a capacitance of 0.1 microfarads (u F), for example. When the transistor Q11 is conducting current, the transistor Q9 may also conduct current, which drives the transistor Q11 to remain on, or latched. When sunlight, for example, is not available to charge the photovoltaic cell 405 (e.g., the photovoltaic cell current generation is minimal), the latch circuit may draw a small amount of current from the supercapacitors C2, C4 through the path defined by the resistor R9, the transistor Q9, and the resistor R13, in order to maintain the transistor Q11 in the latched state. Therefore, the resistance of the resistor R9 should be selected to be sufficiently large to limit the current draw so as not to drain the supercapacitors C2, C4. For example, the resistor R9 may have a resistance of 400 KΩ.

The latching circuit may be characterized by an unlatching voltage $V_{unlatch}$, which may be defined as the supplemental supply voltage $V_{SUPP}$ (that is, the voltage across the supercapacitors C2, C4) at which the transistor Q11 transitions from an "on" (or latched state) to an "off" (or unlatched state). The unlatching voltage $V_{unlatch}$ may be calculated according to the following example equation:

$$V_{unlatch} = \left[ \frac{V_{BE,Q11}}{R_{13}} \cdot R_9 + V_{CE,Q9} + V_{BE,Q11} \right]$$

where $V_{BE,Q11}$ is the voltage across the base-emitter junction of the transistor Q11 when the transistor Q11 is conducting (also the voltage across the resistor R13); $R_{13}$ and $R_9$ are the resistances of the resistors R13, R9, respectively; and $V_{CE,Q9}$ is the voltage across the collector-emitter junction of the transistor Q9 when the transistor Q9 is conducting current. The unlatching voltage $V_{unlatch}$ is equal to the minimum supplemental supply voltage required to maintain the latch circuit in the latched state. The unlatching voltage $V_{unlatch}$ may be selected to be equal to the minimum threshold of the supercapacitors C2, C4. For example, the unlatching voltage $V_{unlatch}$ may be approximately 4.2V. The unlatching voltage $V_{unlatch}$ may be set by setting the resistance of the resistors R9 and R13 to appropriate values. For example, the resistance R13 of the resistor R13 may be 56 KΩ to set the unlatching voltage $V_{unlatch}$ to 4.2V if the collector-emitter voltage $V_{CE,Q9}$ is 0.1V, the base-emitter voltage $V_{BE,Q11}$ is 0.5V, and the resistance R9 of the resistor R9 is 400 KΩ.

Additional circuit elements may be added to increase the functionality of the latch circuit. For example, a diode D6 may be included in the latch circuit to prevent reverse-biasing of the base-emitter junction of the transistor Q9.

When the voltage $V_{SUPP}$ on the supercapacitors C2, C4 falls below the minimum threshold (e.g., $V_{SUPP}$ is less than the unlatching voltage $V_{unlatch}$), the transistor Q11 may stop conducting current. For example, when the voltage of the supercapacitors C2, C4 falls below the minimum threshold (e.g., 4.2 volts), power may be provided to the power converter circuit 216 from the battery 204. The battery 204 may be connected to the power converter circuit through an electronic switch, e.g., a FET Q3, and a diode D2. The diode D2 may act to protect the circuit from reverse voltage, for example, if a user has inserted the batteries backwards in a battery holder. The battery 204 may provide voltage to the buck converter circuit when the supercapacitors C2, C4 contain an insufficient amount of energy.

When the transistor Q11 turns off, the collector-emitter junction of the transistor Q11 may have a high impedance. The high impedance of the transistor Q11 across the collector-emitter junction may cause the gate of the FET Q1 to be biased high by the resistor R15, which effectively pulls up the gate voltage of the FET Q1 to approximately the battery voltage $V_{BATT}$ of the battery 204. The FET Q1 may then begin conducting when the transistor Q11 turns off. The resistance of the resistor R15 may be selected to be a sufficiently high resistance so as not to drain the battery when the FET Q11 is conducting. For example, the resistor R15 may have a resistance of 2.2 MΩ. Likewise, the resistor R17 may also have a high resistance to not drain the battery 204 when the FET Q1 is conducting. For example, the resistor R17 may have a resistance of 1 MΩ.

The transistor Q1 may be an enhancement mode n-channel metal oxide semiconductor field effect transistor (NMOS FET). When the FET Q1 turns on and begins conducting current, the gate of the FET Q3 may be pulled down to circuit common. The FET Q3 may then begin conducting current, providing current from the battery 204 to the power converter circuit 216. Diode D4 may prevent current from the batteries charging the supercapacitors C2, C4 when Q3 is on. The electrical load two (i.e., the control circuit 208 and the communication circuit 226) may remain powered by the battery 204 until the voltage on the photovoltaic cell 405 exceeds the maximum threshold, thereby engaging the clamp circuit to enable Q7 to turn on, which turns on Q11 and enables the latching circuit. When the latching circuit is enabled, the gate of Q1 is pulled to circuit common, turning off Q1, which turns off Q3, such that the battery 204 is no longer providing power to the power converter circuit 216.

The configuration of device 400 is an example, and other example configurations are possible. In addition, although device 200 and device 400 are described herein as including a voltage monitor for monitor circuit 218, as described previously, a current monitor may alternatively be used.

Figure 5:
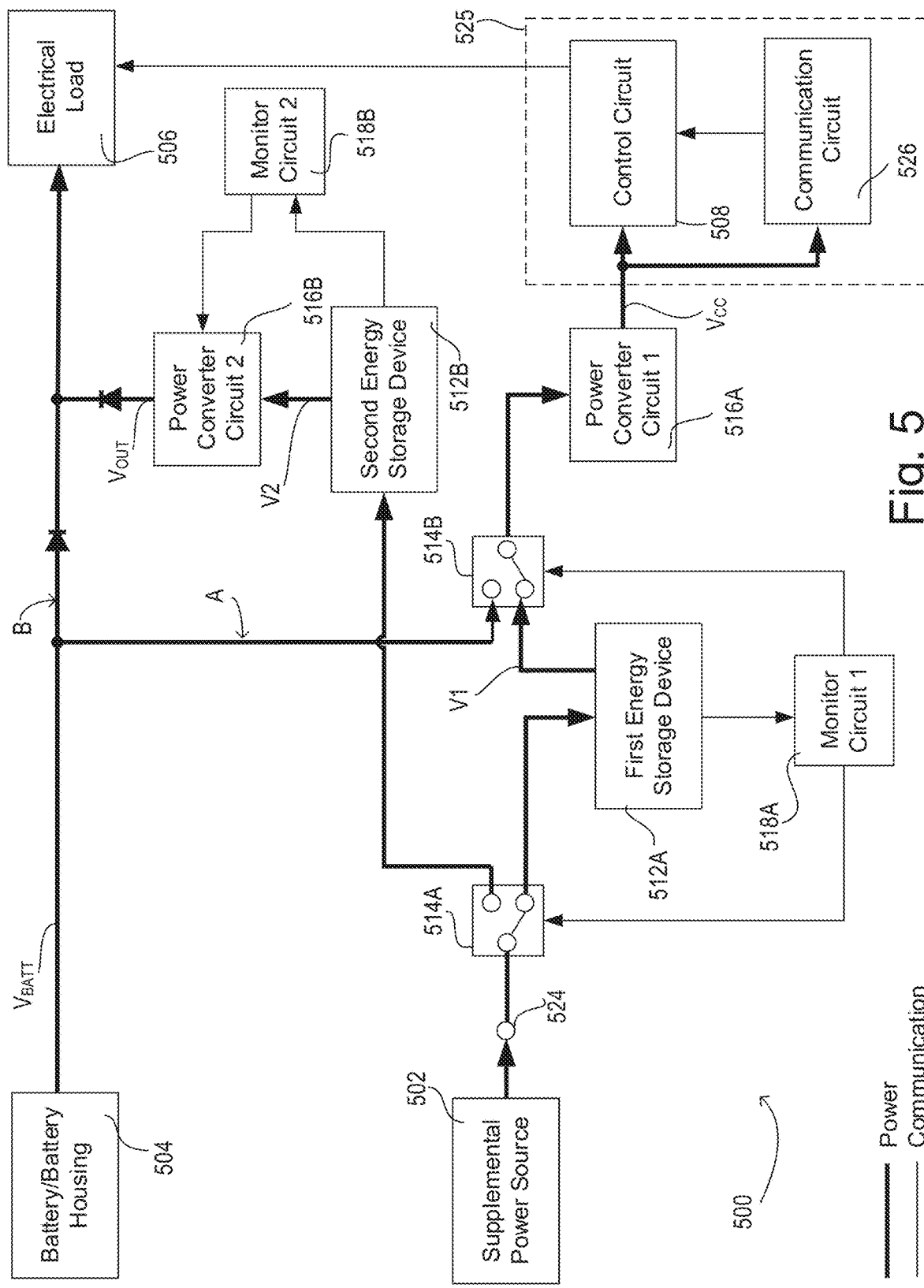
FIG. 5 is an example block diagram of a device with a battery and supplemental power source according to an embodiment.

FIG. 5 is a block diagram of another example device 500. Device 500 may be similar to device 200 of FIG. 2, in that the device 500 may have a battery and/or battery housing 504 and a supplemental power source 502 (such as a solar cell, for example). However, unlike device 200, device 500 may contain two supplemental power supplies for storing energy from the energy storage device, as will be described herein. It should be noted that the thick lines shown denote power connections, which are distinguished from the thinner lines which denote communication lines.

The device 500 may be connected to and provide power to a first electrical load 506. For example, the electrical load 506 may include a H-Bridge motor drive circuit and a motor for driving a fabric of a motorized window treatment. Alternatively, the electrical load 506 may be a sensor, such as a daylight or occupancy sensor, a remote control, an HVAC load, etc. The device 500 many also contain a second electrical load 525. The electrical load 525 may be an internal electrical load. For example, the electrical load 525 may include internal circuitry such as a control circuit 508 and a communication circuit 526. The electrical load 525 comprising the communication circuit and the control circuit may handle the communication and power management of the device 500, as well as the functions of the electrical load 506.

The device 500 may contain a battery and/or battery housing 504. The battery may be contained within the battery housing, which may be integrated into the device 500 or may be external to the device 500. The battery 504 of the device 500 may provide power to either or both of the first electrical load 506 and the second electrical load 525. For example, similar to device 200 shown in FIG. 2, the battery 504 of device 500 may provide a voltage $V_{BATT}$ to power the electrical load 506 through path B. The battery 504 may alternatively or additionally provide power to the electrical load 525 through path A, as will be discussed in greater detail herein.

As described, the device 500 may contain a supplemental power source 502. The supplemental power source may be, for example, a photovoltaic cell. Other examples are possible.

The supplemental power source of the device 500 may provide power to a first and/or a second energy storage device, such as first energy storage device 512A and second energy storage device 512B as shown in FIG. 5. The first and second energy storage devices 512A, 512B, may provide power to one or both of the electrical load 506 and the electrical load 525. That is, the supplemental power source 502 may provide power to either or both of the electrical load 506 and/or the electrical load 525 via the first and second energy storage devices 512A and 512B, as will be described in greater detail herein.

Power may be provided to the electrical load 525 (i.e., the control circuit 508 and the communication circuit 526) via a power rail $V_{CC}$. The power rail $V_{CC}$ may be provided through a first power converter circuit 516A. The first power converter circuit 516A may receive power from an output switch 514B, which may control the source of the power provided to the first power converter circuit 516A by switching between either of the first energy storage device 512A and the battery 504. That is, the output switch 514B may change state (or position) to change the source of power provided to the first power converter circuit 516A. When the output switch 514B is in a first state (or first position), the battery 504 may provide power to the voltage rail $V_{CC}$ through path A through the output switch 514B as shown, to the first power converter circuit 516A, and then to the electrical load 525. For example, when the output switch is in a second state (or in a second position), the first energy storage device 512A may provide power to the voltage rail $V_{CC}$, thereby powering the electrical load 525 through the first power converter circuit 516A.

The first power converter circuit 516A may condition the power received from the output switch 514B to provide an appropriate amount of power to the power rail $V_{CC}$ for powering the control circuit 508 and the communication circuit 526 of the electrical load 525. For example, the battery 504 may provide a voltage which may exceed a voltage threshold $V_{CCmax}$ for the electrical load 525. For example, the battery 504 may provide a voltage of 5V or 6V, as required by the motor, while the electrical load 525 may only need power rail $V_{CC}$ voltage of 2.5V or 3V. When the power received by the output switch 514B has a voltage that is too high for control circuit 508 and/or the communication circuit 526 (i.e., the received voltage exceeds $V_{CCmax}$), the first power converter circuit 516A may reduce the voltage received by the output switch. For example, the first power converter circuit 516A may be a buck converter. The buck converter may reduce the voltage received by the output switch 514B to a lower level, such as 2.5V or 3V when $V_{CCmax}$ is 3.5V, for example. Alternatively, the power converter circuit 516A may be a linear regulator, a resistor-divider circuit, etc.; however, one will understand these alternate components may consume more power than a buck converter.

As previously described, the device 500 may further contain a first and a second energy storage device, 512A, 512B, respectively, for storing power provided by the supplemental power source 502. The first and second energy storage devices may be capacitors, such as supercapacitors, for example, similar to the energy storage device 212 of FIG. 2. Alternatively, the first and second energy storage devices may be rechargeable batteries, or any other electrical energy storage device.

The supplemental power source 502 may provide power to one or both of the first and second energy storage devices 512A, 512B via an input switch 514A. The input switch 514A may change state (or position) to change which energy storage device receives power from the supplemental power source. For example, when the input switch 514A is in a first state (or first position), the supplemental power source 502 may provide power to the second energy storage device 512B. For example, when the input switch 514A is in a second state (or second position), the supplemental power source 502 may provide power to the first energy storage device 512A (i.e., to charge the first energy storage device). According to this configuration, the input switch 514A may only allow either the first or the second energy storage device to receive power from the supplemental power source. That is, the first and second energy storage devices may not simultaneously receive power from supplemental power source.

The device 500 may contain a first energy storage device 512A and a second energy storage device 512B. The first and second energy storage devices 512A, 512B may be monitored by first and second monitor circuits 518A, 518B, respectively. Although not shown, the first and second monitor circuits may communicate with the control circuit 508. Additionally or alternatively, the first and second monitor circuits 518A, 518B may be integrated with the control circuit 508. For example, the first and second monitor circuits 518A, 518B may each be an analog-to-digital (A/D) port on the control circuit. Or, the first and second monitor circuits 518A, 518B may comprise standalone circuitry.

The first energy storage device 512A may be monitored by the first monitor circuit 518A. The first monitor circuit 518A may monitor a voltage or energy level of the first energy storage device 512A. For example, the first monitor circuit 518A may monitor a voltage level V1 of the first energy storage device 512A. The first monitor circuit 518A may further control one or more switches 514A, 514B in response to the measured voltage or energy level, as will be discussed in greater detail herein. For example, the first monitor circuit 518A may monitor the voltage of the first energy storage device 512A and compare the measured voltage V1 to one or more thresholds. Based on the comparison, the first monitor circuit 518A may provide a control signal to the input switch 514A to change the state of the input switch, allowing power from the supplemental power source 502 to be provided to either the first energy storage device 512A or the second energy storage device 512B. The first monitor circuit 518A may act to maintain an optimal voltage level of the first energy storage device 512A, as will be described in greater detail herein.

In a second example, when the first monitor circuit 518A compares the measured voltage V1 to one or more thresholds, based on the comparison, the first monitor circuit 518A may provide a control signal to the output switch 514B to change the state of the output switch 514B. For example, the first monitor circuit 518A may monitor the voltage on the first energy storage device 512A and may determine whether the voltage drops below a first threshold. In response to determining that the voltage on the first energy storage device 512A has dropped below the first threshold, the monitor circuit 518A may provide a control signal to the output switch 514B to change the state of the output switch 514B, allowing power from the battery 504 to be provided to the first power converter circuit 516A.

If the voltage V1 exceeds the first threshold, and further exceeds a second threshold greater than the first threshold, the first monitor circuit 518A may further change the state of the input switch 514A to the first state to provide power to the second energy storage device 512B from the supplemental power source 502. This and other examples will be discussed in greater detail herein.

The second energy storage device 512B may receive power from the supplemental power source 502 when the input switch 514A is in a first state (or first position) as previously described. The energy stored in the second energy storage device 512B may be used to power the electrical load 506 through a second power converter circuit 516B. The second power converter circuit 516B may have an output voltage $V_{OUT}$. The second power converter circuit 516B may be a boost circuit, for example. The boost circuit may increase, or boost, a voltage V2 supplied by the second energy storage device 512B, such that the output voltage $V_{OUT}$ exceeds a voltage $V_{BATT}$ supplied by the battery 504. When the output voltage $V_{OUT}$ exceeds $V_{BATT}$, the battery 504 may cease providing power to the electrical load 506, and the second energy storage device 512B may provide power to the electrical load 506. This is depicted through the use of two diodes, however, one will understand that active circuitry such as an active switch may alternatively be used to switch the power supplied to the electrical load 506 from $V_{BATT}$ to $V_{OUT}$, and vice versa.

The device 500 may have a second monitor circuit 518B to monitor the second energy storage device 516B. The second monitor circuit 518B may monitor a voltage, for example, an amount of voltage V2 on the second energy storage device 512B, and may enable or disable the second power converter circuit 516B based on the amount of voltage on the second energy storage device 512B. For example, the second energy storage device 512B may only power the electrical load 506 when the second energy storage device 512B contains a sufficient amount of power. In this way, the device 500 may either enable or disable the second power converter circuit 516B to selectively power the electrical load 506 from the second energy storage device 512B based on the voltage level of the second energy storage device 512B, as monitored by the second monitor circuit 518B.

As described, the second monitor circuit 518B may monitor the voltage V2 on the second energy storage device 512B and may communicate the measured voltage V2 to the control circuit 508. Based on the received communication from the second monitor circuit 518B, the control circuit may compare the voltage with a third and a fourth threshold to determine whether the voltage exceeds the third and/or the fourth threshold. Based on the determination, the control circuit may determine whether the second power converter circuit 512B should be enabled or disabled (i.e., whether the second energy storage device 512B contains sufficient charge, as measured by the amount of voltage V2). For example, if the control circuit 508 determines that the voltage V2 is less than the third threshold, the second power converter circuit 516B should remain disabled to allow the battery to power the second electrical load. If, however, the control circuit 508 determines that the voltage V2 on the second energy storage device exceeds the third and the fourth threshold, the control circuit 508 may determine to enable the second power converter circuit 516B to allow the electrical load 506 to be powered by the second energy storage device 512B, instead of the battery 504. The third threshold may be set such that when the second power converter circuit 516B is enabled, the voltage output by the second power converter circuit $V_{OUT}$ exceeds the voltage $V_{BATT}$, thereby allowing the second energy storage device to provide power to the electrical load 506 instead of the battery 504, as previously described.

In response to the determination that the second power converter circuit 516B should be enabled or disabled, the control circuit 508 may communicate via one or more messages to the second monitor circuit 518B to enable or disable the second power converter circuit 516B. In response to the communication, the second monitor circuit 518B may enable or disable the second power converter circuit 516B. For example, when the voltage V2 measured by the monitor circuit 518B exceeds the fourth threshold, the control circuit 508 may communicate to the second monitor circuit 518B to enable the second power converter circuit 516B. The second monitor circuit 518B may then enable the second power converter circuit, thereby powering the electrical load 506 from the second energy storage device 512B. Although not shown, one will understand additional drive circuitry, for example, a motor drive circuit, may be included to drive the electrical load, as previously described.

Figure 6A:
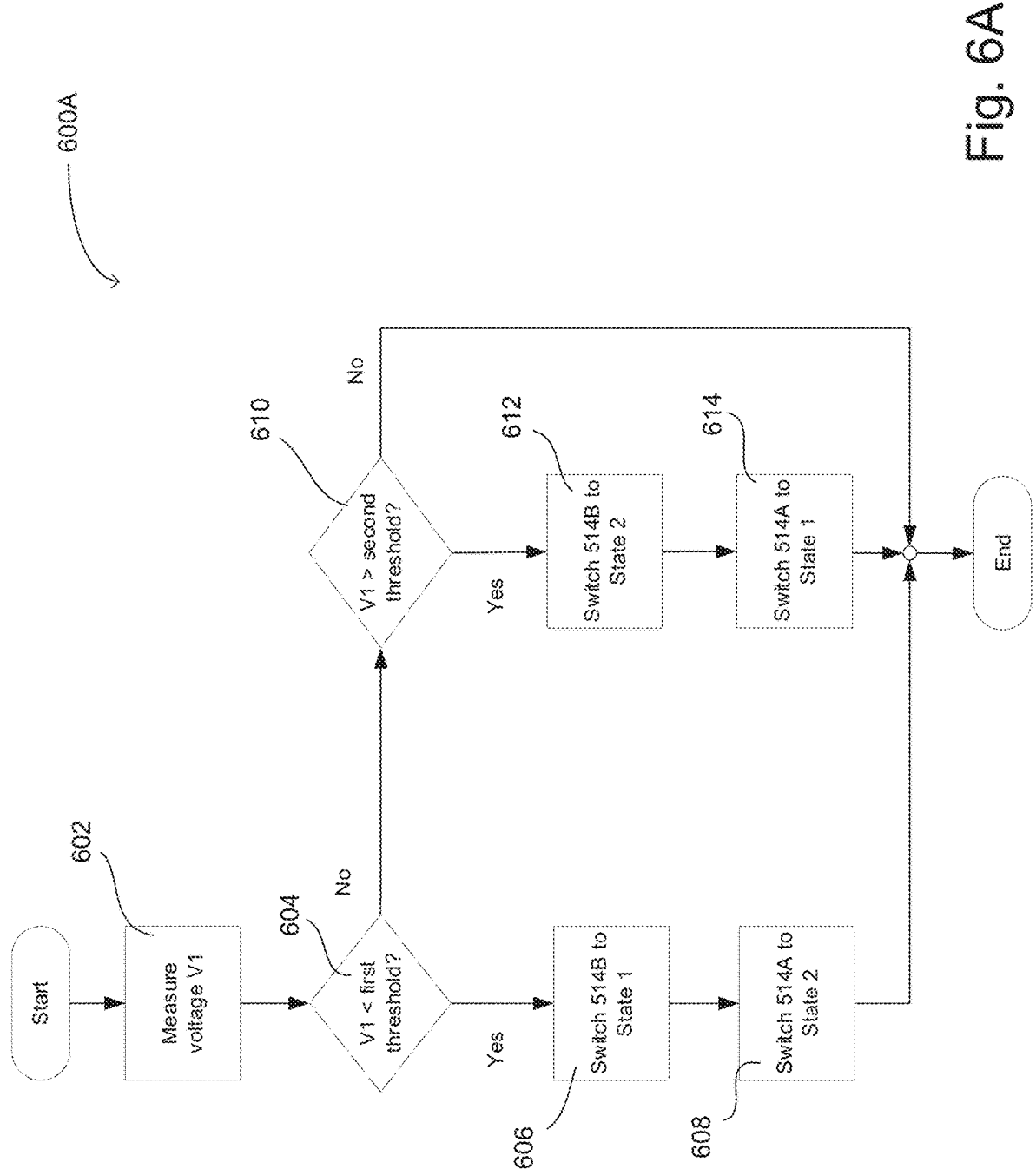
FIGS. 6A, 6B, and 6C are example methods which may be executed by one or more monitor circuits to control the input and output switches, and to enable and disable a power converter circuit.
Figure 6B:
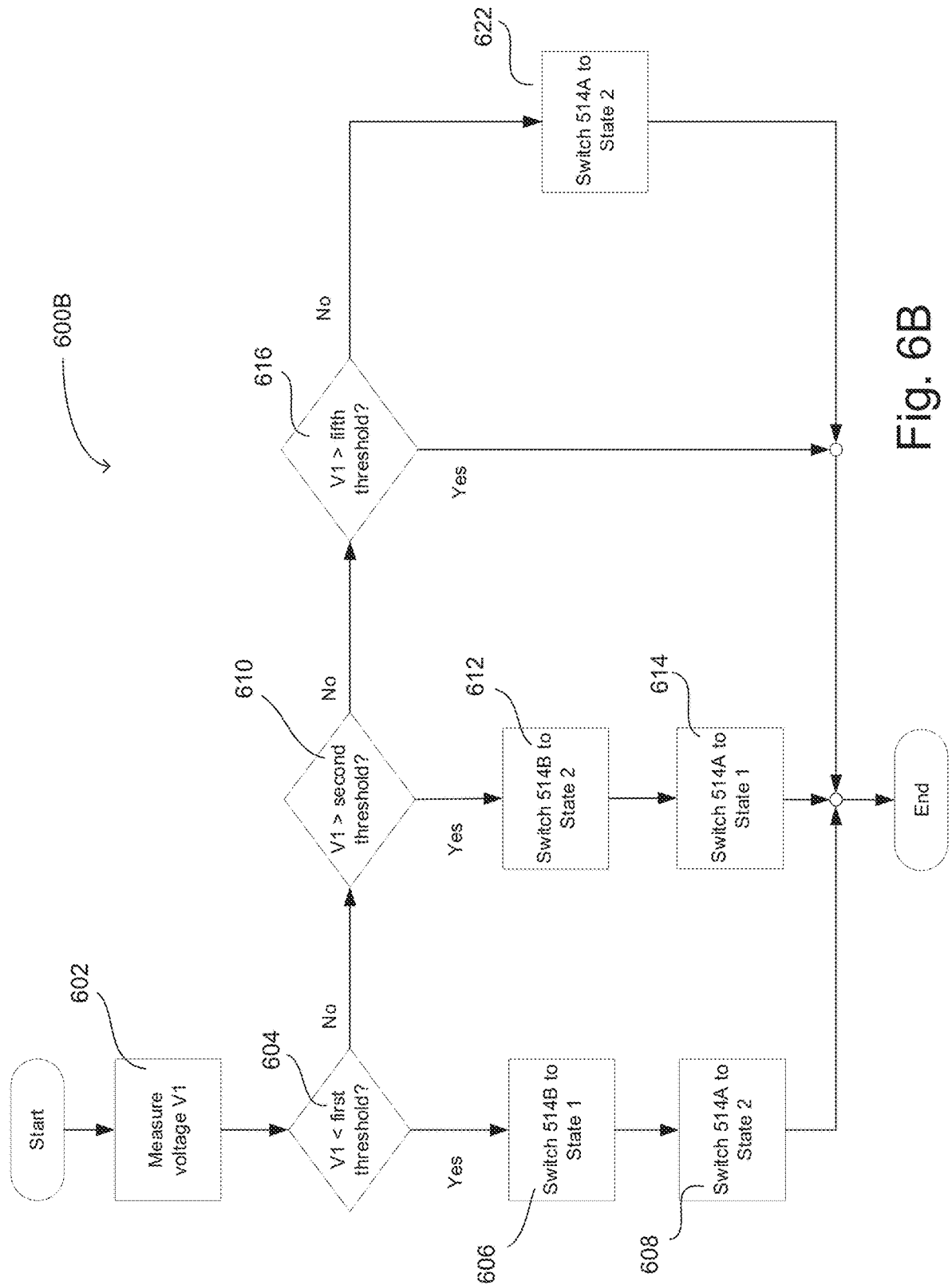
Figure 6C:
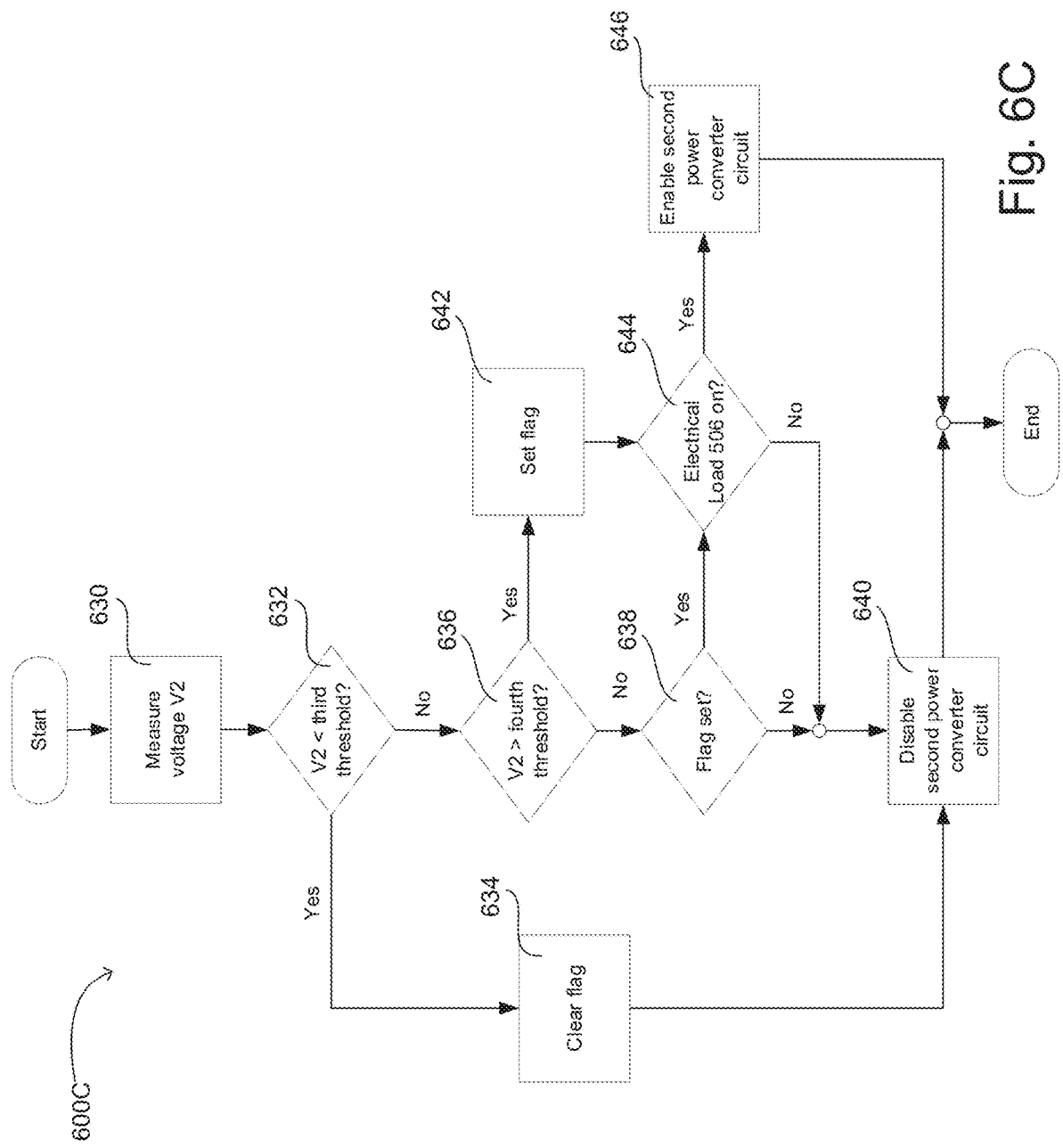
Figure 7A:
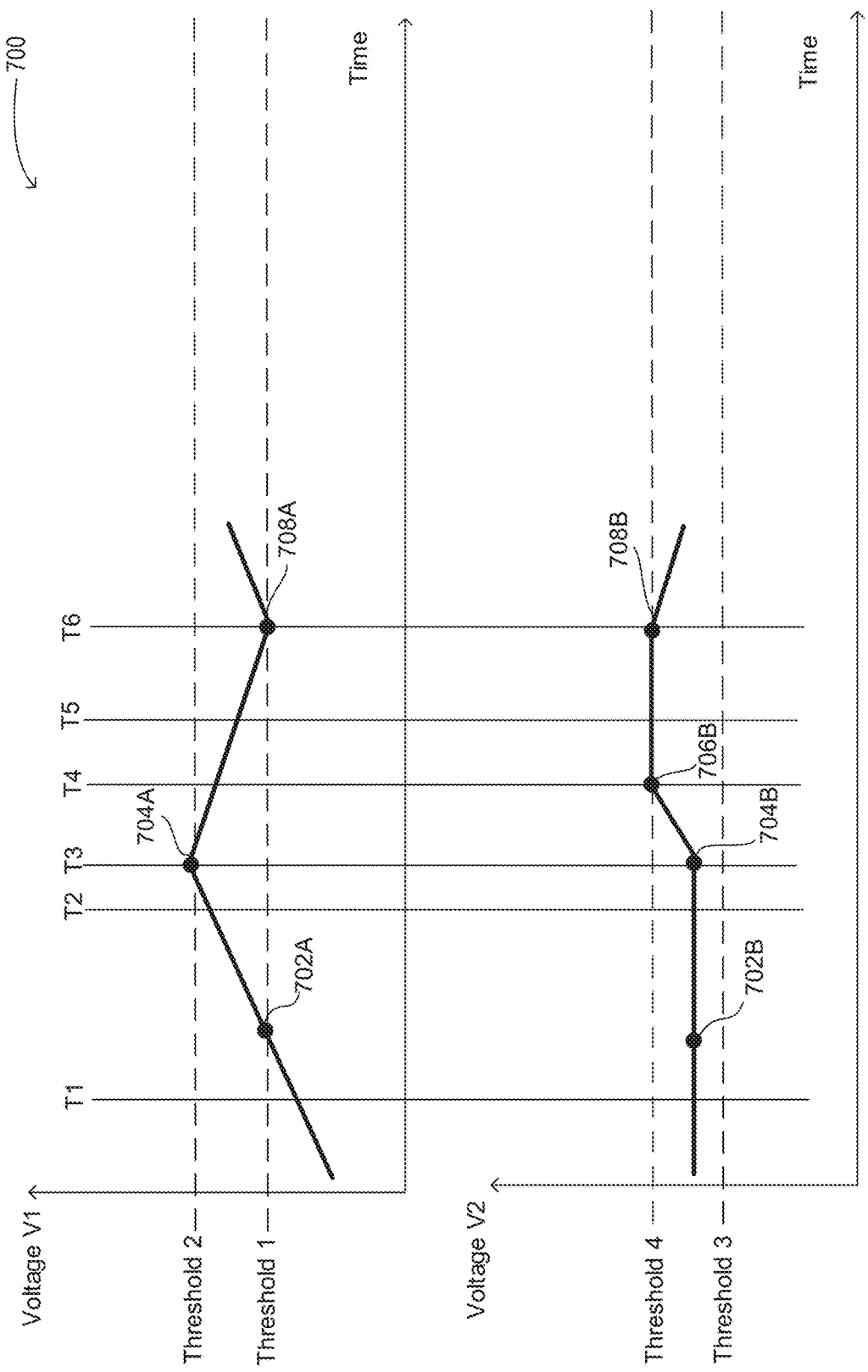
FIG. 7A is an example graph of voltage over time on the first and second energy storage devices with respect to the methods shown in FIGS. 6A, 6C.
Figure 7B:
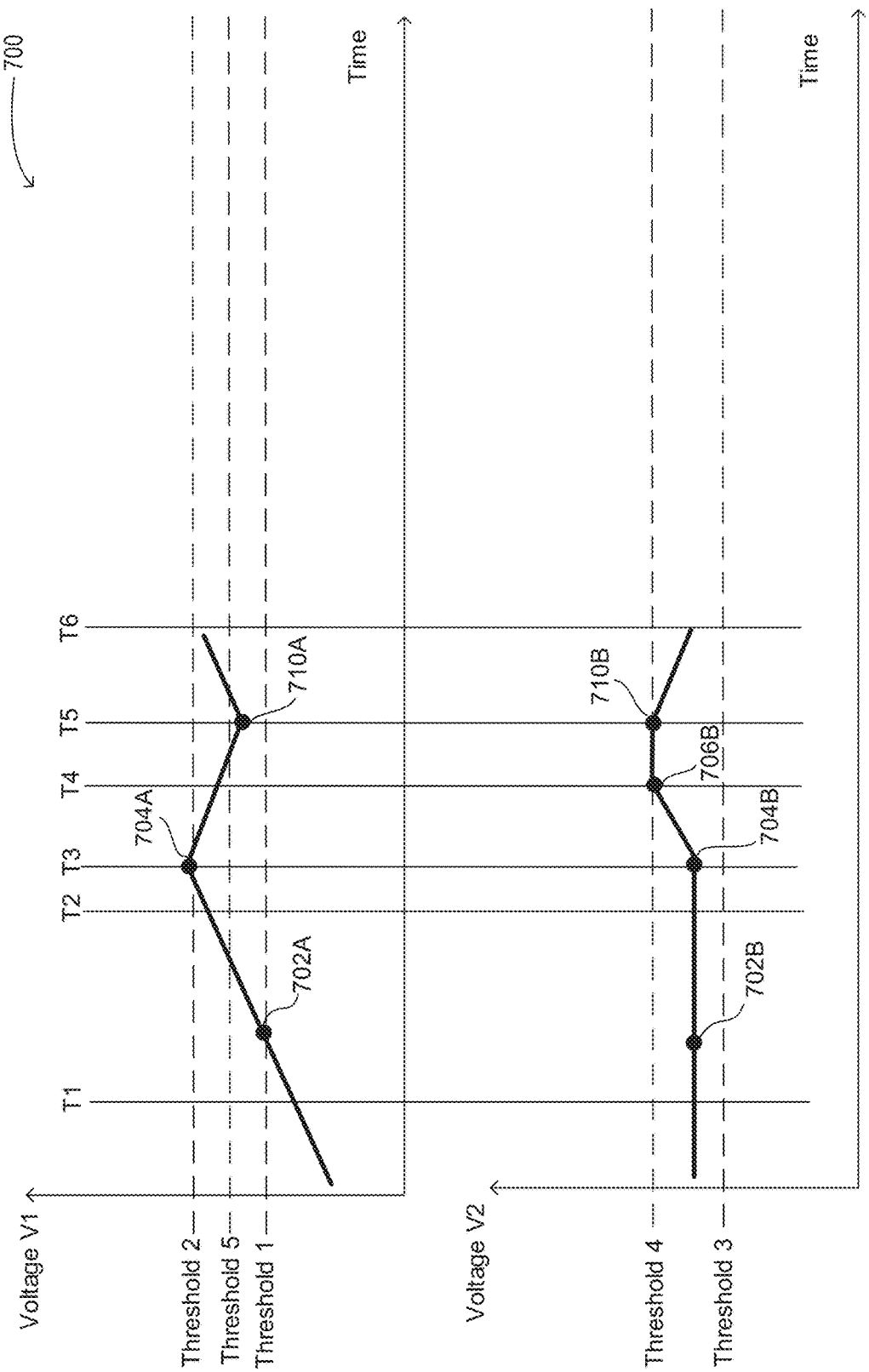
FIG. 7B is an example graph of voltage over time on the first and second energy storage devices with respect to the methods shown in FIGS. 6A, 6B.

FIGS. 6A-6C depict example flowchart diagrams of methods which may be executed by the first and/or second monitor circuits 518A, 518B to control the switches 514A, 514B, and the second power converter circuit 516B. FIGS. 7A, 7B show example voltages over time for the first and the second energy storage devices 512A, 512B, which will be described in tandem with FIGS. 6A-C. For this example, the input switch 514A may start in the second state, wherein the supplemental power source 502 may provide power to the first energy storage device 512A. Further, the output switch 514B may start in the first state, where the battery 504 may provide power the first power converter circuit 516A. Additionally, the second power converter circuit 516B may be disabled. Hence, the voltage V1 of the first energy storage device 512A may be increasing at point 702A of FIG. 7A as the first energy storage device receives power from the supplemental power source, and no output power of the first power converter circuit 516A is provided. Correspondingly, the voltage V2 of the second energy storage device may remain substantially constant at point 702B as the second energy storage device 512B does not receive power from the supplemental power source 502, nor provides power to the second power converter circuit 516B.

The first and second monitor circuits may sample, or measure, the voltages V1, V2 respectively. For example, the first and second monitor circuits may sample the voltage periodically, for example, once every millisecond. Each time the first and/or second monitor circuits sample the voltage V1 and/or V2, one or more of the methods 6A-C may be executed. The times T1, T2, T3, T4, T5, and T6 may indicate example times when the methods 6A-C may be executed. One will understand that times T1-T6 are provided for illustration purposes only, that is, the method may be executed much more frequently than just those times shown.

For example, in FIG. 7A, at time T1, method 6A may be implemented by the first monitor circuit 518A. The method 600A of FIG. 6A may start at step 602 by the first monitor circuit 518A measuring the voltage V1 of the first energy storage device 512A. At step 604, the first monitor circuit 518A may determine whether the voltage V1 is below a first threshold. The first threshold may be set to allow the first power converter circuit 516A to maintain power to the $V_{CC}$ rail to power the electrical load 525. For example, if the electrical load 525 requires a minimum voltage input of 2.5V, the first threshold may be set to 3V to ensure that no interruption of power to the electrical load 525 is experienced.

At time T1, the first monitor circuit 518A may determine that the voltage V1 is below the first threshold. The method may then proceed to step 606 where the first monitor circuit 518A may change the state of the output switch 514B to the first state (if the output switch 514B is not already in the first state), to provide power to the first power converter circuit 516A via the battery 504. The first monitor circuit 518A may then change the state of the input switch 514A to the second state (if necessary) to ensure that the first energy storage device 512A is being charged by the supplemental power source. The method may then end.

The voltage V1 on the first energy storage device 512A may begin to rise as power is received from the supplemental power source 502. At point 702A, the voltage V1 may reach and exceed the first threshold. At time T2, the method 600A of FIG. 6A may again execute, and the first monitor circuit 512A may again measure the voltage V1 at step 602. The first monitor circuit 518A may then determine at step 604 that the voltage V1 exceeds the first threshold. The first monitor circuit 518A may then further determine whether the voltage V1 exceeds a second threshold at step 610 of method 600A. The second threshold may be, for example, 4.5V. After determining that the voltage V1 does not exceed the second threshold, the method may then exit.

At time T3, the method 600A may again execute, this time through steps 602, 604, and 610 as described. At step 610, the first voltage monitor circuit 518A may determine that the voltage V1 exceeds the second threshold. When the voltage V1 exceeds the second threshold, the first energy storage device may contain sufficient power (i.e., adequate voltage) to provide power the first power converter circuit 516A, instead of relying on the battery 504. In response to determining that the voltage V1 exceeds the second threshold, the first voltage monitor circuit 518A may change the state of the output switch 514B to the second state at step 612, which may allow the first energy storage device 512A to provide power to the first power converter circuit 516A. Correspondingly, the voltage V1 may being to decrease after time T3.

The first monitor circuit 518A may further change the state of the input switch 514A to the first state at step 614, which may allow the supplemental power source 502 to begin charging (i.e., providing power to) the second energy storage device 512B. The voltage V2 on the second energy storage device 512B may then begin to increase at point 704B. The method 600A may then end.

As is apparent, the first monitor circuit 518A may affect the voltage V1 by controlling the power provided to the first energy storage device 512A through the input switch 514A, and controlling the power provided by the first energy storage device 512A through the output switch 514B. Additionally, the first monitor circuit 518A may further impact the voltage V2 on the second energy storage device by determining when power is provided to the second energy storage device 512B through control of the input switch 514A. The voltage V2 of the second energy storage device may additionally be impacted by whether or not power is provided to the second power converter circuit 516B, i.e., whether or not the second power converter circuit is enabled. The second monitor circuit 518B may control whether or not the second power converter circuit 516B is enabled, and therefore, may control the discharge of voltage V2 on the second energy storage device 512B. The second monitor circuit may periodically execute method 600C to measure the voltage V2 and determine whether or not to enable the second power converter circuit 516B.

For example, the second monitor circuit 518B may execute the method 600C of FIG. 6C at time T4. The method 600C may begin at step 630 by measuring the voltage V2. At step 632, the second monitor circuit 518B may determine whether the voltage V2 is below a third threshold. The third threshold may be, for example, 3.5V. When the voltage V2 is below the third threshold, the voltage V2 may be too low to provide sufficient power to the power converter circuit 516B to allow the output power $V_{OUT}$ to exceed the battery voltage $V_{BATT}$. The second monitor circuit 518B may then clear a flag at step 634 and disable the second power converter circuit 516B at step 640. For example, the second monitor circuit may communicate with the control circuit 508 to set, clear, or determine the status of the flag. The control circuit 508 may store the state of the flag in memory. The method may then end.

If, at step 632, the voltage V2 is greater than or equal to the third threshold, the second monitor circuit 518B may then compare the voltage V2 to a fourth threshold and determine whether the voltage V2 exceeds the fourth threshold at step 636. The fourth threshold may be, for example, 4.5V. If the voltage V2 exceeds the fourth threshold, the second monitor circuit may then communicate with the control circuit 508 to set the flag at step 642. The second monitor circuit 518B may then determine whether or not the electrical load 506 is on at step 644.

If, however, at step 636 the voltage V2 does not exceed the fourth threshold, the second monitor circuit 518B may then determine whether or not the flag has been set. If the flag has not been set, the second monitor circuit may ensure that the second power converter circuit 516B is disabled at step 640. The method may then end. However, if the flag has been set, the second monitor circuit may determine whether or not the second electrical load 506 is on at step 644. For example, the monitor circuit may query the control circuit 508 to determine whether the electrical load 506 is on. If the electrical load 506 is not on, the method 600C may again progress to step 640, disable the second power converter circuit 516B, and then end. However, if the electrical load 506 is on, the second monitor circuit 518B may enable the second power converter circuit at step 646. The method may then end.

Setting the flag at step 642 after the voltage V2 exceeds the fourth threshold may allow the second power converter circuit 516B to be enabled (i.e., to power the load 506) while the voltage V2 on the second energy storage device 512B remains above the third threshold and the electrical load 506 is on. For example, in FIG. 7A, when the voltage V2 on the second energy storage device reaches/exceeds the fourth threshold at point 706B, assuming the electrical load is on at step 644 of method 600C, the second power converter circuit 516B may be enabled (see step 646 of FIG. 6C). That is, the second power converter circuit 516B may be enabled to provide power to the electrical load 506 even when the voltage V2 is below the fourth threshold, provided V2 exceeds the third threshold.

From point 706B to point 708B, the voltage of V2 may remain essentially constant. For example, the second energy storage device may power the electrical load 506 and may also receive power (i.e., may be charging) from the supplemental power source 502 during this time period.

At time T5 the method 600A may again execute. The results may be the same as when the method was executed at time T4. At time T6, the method 600A may again execute. As the voltage V1 at point 708A has now discharged to a minimum level (i.e., V1 is less or equal to the first threshold), the first monitor circuit 518A may change the state of the input switch 514A to the second position to charge the first energy storage device 512A, as described in method 600A of FIG. 6A. Correspondingly, after point 708B at time T6 the voltage V2 may begin to decrease as power is supplied from the second energy storage device 512B to the second power converter circuit to power to the electrical load 506, and while the supplemental power source 502 is charging the first energy storage device 512A (i.e., the second energy storage device is not receiving power from the supplemental power source). When the voltage V2 drops below the third threshold, or when the voltage V2 is between the third and fourth threshold while the electrical load 506 is off, the second power converter circuit 516B may be disabled, and the voltage V2 may again remain essentially constant.

FIG. 7B is an alternate example of voltages V1, V2 over time while the first and second monitor circuits use methods 600B and 600C of FIGS. 6B, 6C, respectively. Method 600B may contain similar steps to method 600A of FIG. 6A, and may be executed by the first monitor circuit 518A. The method 600B may contain additional steps 616-622, which may allow the first energy storage device 512A to start charging at an earlier time by providing an additional threshold by which to compare the voltage and control the input switch 514A. For example, FIG. 7B may include a fifth threshold for voltage V1. The fifth threshold may be greater than the first threshold and less the second threshold. For example, the fifth threshold may be set to 3.75 V, which is halfway between the first and second thresholds. Other examples are possible. The fifth threshold may be set to establish priority between the first and second energy storage devices to determine which energy storage device should receive power from the supplemental power source.

The execution of method 600B at time T1 may be the same as previously described. At time T2, the first monitor circuit 518A may measure the voltage V1. The first monitor circuit 518A may then compare the measured voltage V1 to the first threshold at step 604 and determine that V1 exceeds the first threshold. The method may then proceed to step 610, where the first monitor circuit 518A may compare the measured voltage V1 to the second threshold and determine that V1 does not exceed the second threshold. At step 616, the first monitor circuit 518A may then compare the voltage V1 with the fifth threshold and determine that V1 does exceed the fifth threshold. The method 600B may then end, and the input switch 514A may remain in the second state (i.e., the first energy storage device may continue to receive power from the supplemental power source 502). The execution of method 600B at time T3 may be the same as previously described.

At time T4, the method 600B may again execute. The first monitor circuit 518A may measure the voltage V1 at step 602 and determine at step 604 that the voltage V1 exceeds the first threshold. The first monitor circuit 518A may further determine at step 610 that the voltage V1 does not exceed the second threshold. At step 616, the first monitor circuit 518A may determine that the voltage V1 exceeds the fifth threshold. The method may then end. At the same time T4, or near the time T4, the second monitor circuit may execute method 600C as previously described. If the electrical load 506 is on, the second power converter circuit may be enabled to power the electrical load 506, and the voltage V2 may remain essentially constant.

At time T5, the first monitor circuit 518A may again execute the method 600B through steps 602, 604, and 610. At step 616, the first monitor circuit 518A may determine that V1 is now below the fifth threshold (i.e., does not exceed the fifth threshold). In response to determining that V1 is below the fifth threshold, the first monitor circuit 518A may change the state of the input switch 514A to the second state, if necessary, to ensure that the first energy storage device 512A is charging. At point 710A, the voltage V1 may begin to increase as the first energy storage device 512A receives power from the supplemental power source 502. Correspondingly, the voltage V2 on the second energy storage device 512B may begin to decrease as power is no longer supplied from the supplemental power source 502 to the second energy storage device 512B (while the second energy storage device 512B is supplying power via the enabled second power converter circuit 516B to the electrical load 506). One will understand that if the electrical load 506 is not on, according to method 600B, the voltage V2 on the second energy storage device 512B will not be decreasing after point 710B, as the power loss from the second energy storage device 512B providing power to the second power converter circuit 516B is substantially minimal.

Figure 8:
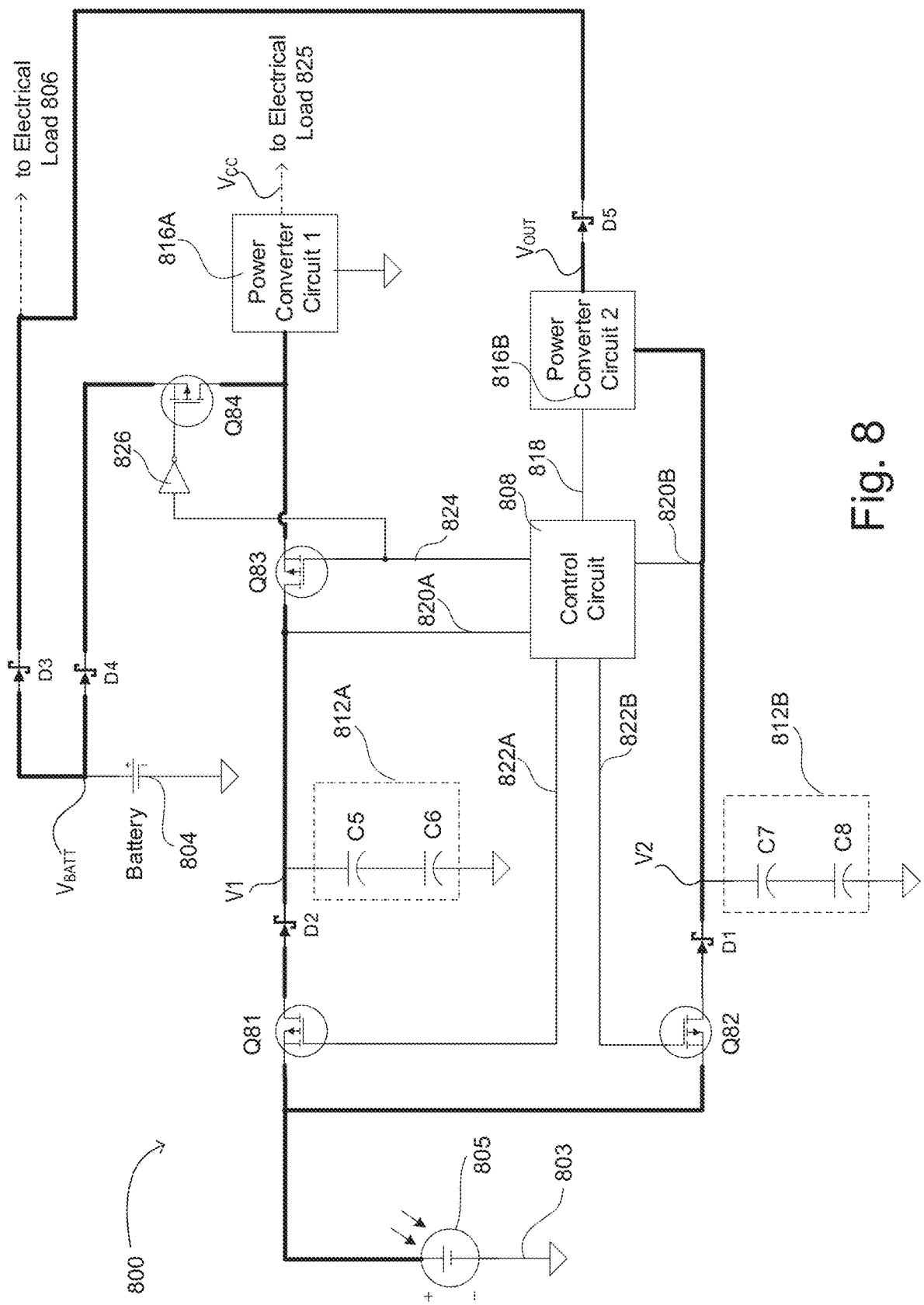
FIG. 8 is an example schematic based on the block diagram of FIG. 5.

FIG. 8 shows a device 800 which is an example implementation of device 500 of FIG. 5. The monitor circuits 518A, 518B of FIG. 5 (in this example a voltage monitor circuit) are integrated into a control circuit 808 of FIG. 8. The input switch 514A of FIG. 5 is depicted in schematic form as the transistors Q81, Q82 of FIG. 8. The output switch 514B of FIG. 5 is depicted as the transistors Q83, Q84 of FIG. 8. Device 800 further includes components shown in FIG. 5 such as: the supplemental power source 502 (shown in this example as photovoltaic cell 805); the first and second energy storage devices 512A, 512B (e.g., shown in this example as energy storage device 812A consisting of supercapacitors C5, C6, and energy storage device 812B consisting of supercapacitors C7, C8, respectively); the first and second power converter circuits 516A, 516B corresponding to 816A, 816B; the battery 504 (corresponding to the battery 804 shown in FIG. 8); and the first electrical load 506, and the second electrical load 525 corresponding to electrical load 806, 825, respectively.

All voltages described in FIG. 8 are measured with reference to circuit common, shown as 803. The transistors Q81, Q82, Q83, and Q84 may all be p-channel metal oxide semiconductor field-effect transistor (PMOS FET), for example, as shown. The control circuit 808 which acts as the first and second monitor circuits to monitor the voltage V1, V2 of the first and second energy storage devices, respectively as shown, may be the same as the control circuit of electrical load 825, or may be a different control circuit.

For example, the control circuit 808 may be the same control circuit of the electrical load 825. The electrical load 825 may further include a communication circuit, as shown in FIG. 5. The communication circuit may be integrated with the control circuit 808, or may be a separate circuit.

One will understand that the voltages V1, V2 need not be the same voltage, and that the control circuit 808 may prioritize which energy storage device has the most charge. For example, the first energy storage device may have a higher priority than the second energy storage device as the first energy storage device may allow the device 800 to continue to power the electrical load 825, thereby allowing the device 800 to continue to communicate and report issues.

The circuit shown may set the impedance for the photovoltaic cell 805. Voltage to the electrical load 825 (e.g., a control circuit, a communication circuit, and/or other low voltage circuitry) may be provided by the first power converter circuit 816. The first power converter circuit 816A may be a buck circuit, for example. Alternatively, the first power converter circuit 816A may be a linear regulator, voltage divider, or the like. The first power converter circuit 816A may reduce the voltage from the battery 804 or first energy storage device 812A to the appropriate level for powering the second electrical load 825 as described previously. For example, the battery voltage $V_{BATT}$ may be any voltage between and/or including 6-9V. For example, the voltage V1 on the first energy storage device may be any voltage between and/or including 3-5V. According to this example, the first power converter circuit 816A may reduce the voltage V1 and/or the voltage $V_{BATT}$ to an output voltage $V_{CC}$ of approximately 2.5V. One will understand that the exact voltages used may be specific to the control circuit selected, the capacitors C5, C6, and the battery 804.

The second power converter circuit may contain an enable/disable line 818. The control circuit 808 may enable or disable the second power converter circuit 816B through an enable/disable line 818. For example, the second power converter circuit 816B may be a boost converter. The boost converter may boost the voltage V2, which may be within the range of 3.5-5V, to the voltage $V_{OUT}$ at 12V.

Voltage to the electrical load 806 may be provided by the second power converter circuit 816B when the output voltage $V_{OUT}$ exceeds the battery voltage $V_{BATT}$, through the use of diodes D3, D5. The diodes D1-D5 shown may be low power loss diodes, for example, Schottky diodes. $V_{OUT}$ may be greater than $V_{BATT}$ when the second power converter circuit 816B is on, that is, enabled. For example, when the second power converter circuit 816B is enabled, the voltage $V_{OUT}$ may be 12V, while the voltage $V_{BATT}$ may be 6-9V. Power may then be provided to the second electrical load 806 by the second energy storage device (i.e., the supercapacitors C7, C8). Alternatively, one will recognize that D3 and D5 may be replaced with an active switch to achieve the same function.

The control circuit may monitor the voltage V1, V2 via two or more analog to digital (A/D) lines shown as 820A, 820B, respectively. The control circuit 808 may use the measured voltages V1, V2 to determine whether or not to enable the second power converter circuit 816B, as previously described.

The control circuit 808 may change the state of the switches Q81, Q82 (which comprise the input switch), based on the voltages V1, V2. For example, the control circuit may control a gate voltage 822A, 822B to turn the transistors Q81, Q82 on or off, respectively. The control circuit 808 may further ensure that only one of Q81 and Q82 is turned on at the same time (i.e., only the first energy storage device 812A or the second energy storage device 812B is charging). The capacitors C5-C8 may be similar to capacitors C2, C4 of FIG. 4. For example, capacitors C5-C8 may be supercapacitors.

The control circuit 808 may change the state of the switches Q83, Q84 (which comprise the output switch), based on the voltages V1, V2. For example, the control circuit may control a gate voltage 824 to turn the FETs Q83, Q84 on or off, respectively. An inverter 826, or other control circuitry establishing the same type of function, may be used to provide a complementary drive signal to the gate of the FET Q84. For example, the inverter 826 may be used to invert the signal 824 such that the gate signal provided to the FET Q84 is the inverted signal provided to the FET Q83. The inverter 826 may ensure that only one of FET Q83, Q84 is on at a time, that is, Q83 and Q84 may not both be on simultaneously. The control circuit 808 may use the gate drive signal 824 and the FETs Q83, Q84, to control power to the first power converter circuit 816A. For example, when the control circuit sends a gate signal 824 to turn on FET Q83 (thereby turning off FET Q84), the first energy storage device 812A may provide power via voltage V1 to the first power converter circuit. Alternatively, a diode may be used in place of FET Q83.

When the gate drive signal 824 of the control circuit 808 turns off FET Q83 (thereby turning on FET Q84), the battery 804 may provide power to the first power converter circuit 816A through the FET Q84 and the diode D4. The FET Q84 may be rendered conductive to provide the battery voltage $V_{BATT}$ from the battery 804 when the energy storage device 812A does not have sufficient charge to provide power to the first power converter circuit 816A, e.g., when the magnitude of the supplemental supply voltage $V_1$ stored by the energy storage device 812A is below the first threshold (for example, below 3 volts).

The voltages on the first and second energy storage devices may be maintained at a level greater than 3V to prevent deep discharging of the energy storage devices. For example, if the first and second energy storage devices are supercapacitors which receive energy from a photovoltaic cell, the amount of voltage on the first and second energy storage devices may determine the efficiency of power transfer from the photovoltaic cell to the first and second energy storage devices, respectively. For example, when the voltage V1 or V2 on the first or second energy storage device drops below a minimum threshold (for example, the first and third thresholds previously described, such as 3-3.5V), the photocell may no longer be able efficiently charge the first and second energy storage devices. That is, the time required for recharging the first and second energy storage device may greatly increase as the voltage V1 or V2 falls below the minimum threshold.

Conversely, the first and second energy storage devices may receive power from the photocell (i.e., may charge) most efficiently around a maximum threshold, that is, the second and fourth threshold, or around 4.5V. However, the voltage V1 or V2 may exceed the maximum threshold for the circuit shown. As such, a further addition to the circuit of device 800 may include a clamp circuit, for example a diode, across the first and/or second energy storage devices, which may clamp the voltage V1 or V2 to the maximum threshold. For example, a clamp circuit may include a diode across supercapacitor bank 812A with a clamping voltage of 5V.

One will understand that the circuit schematic of device 800 shown in FIG. 8 is for illustration purposes only, and that other circuits may be constructed which serve the same function. For example, although the FETs Q81-Q84 are shown as PMOS, one will understand that NMOS FETs may alternatively be used with referencing and biasing updated accordingly. Or, any controllable switching device may be used, such as, for example bipolar junction transistors. Additionally, a diode may be used in place of Q83. These and any alternate circuits having the same resulting functionality as described herein are also considered as alternative embodiments.

Figure 9:
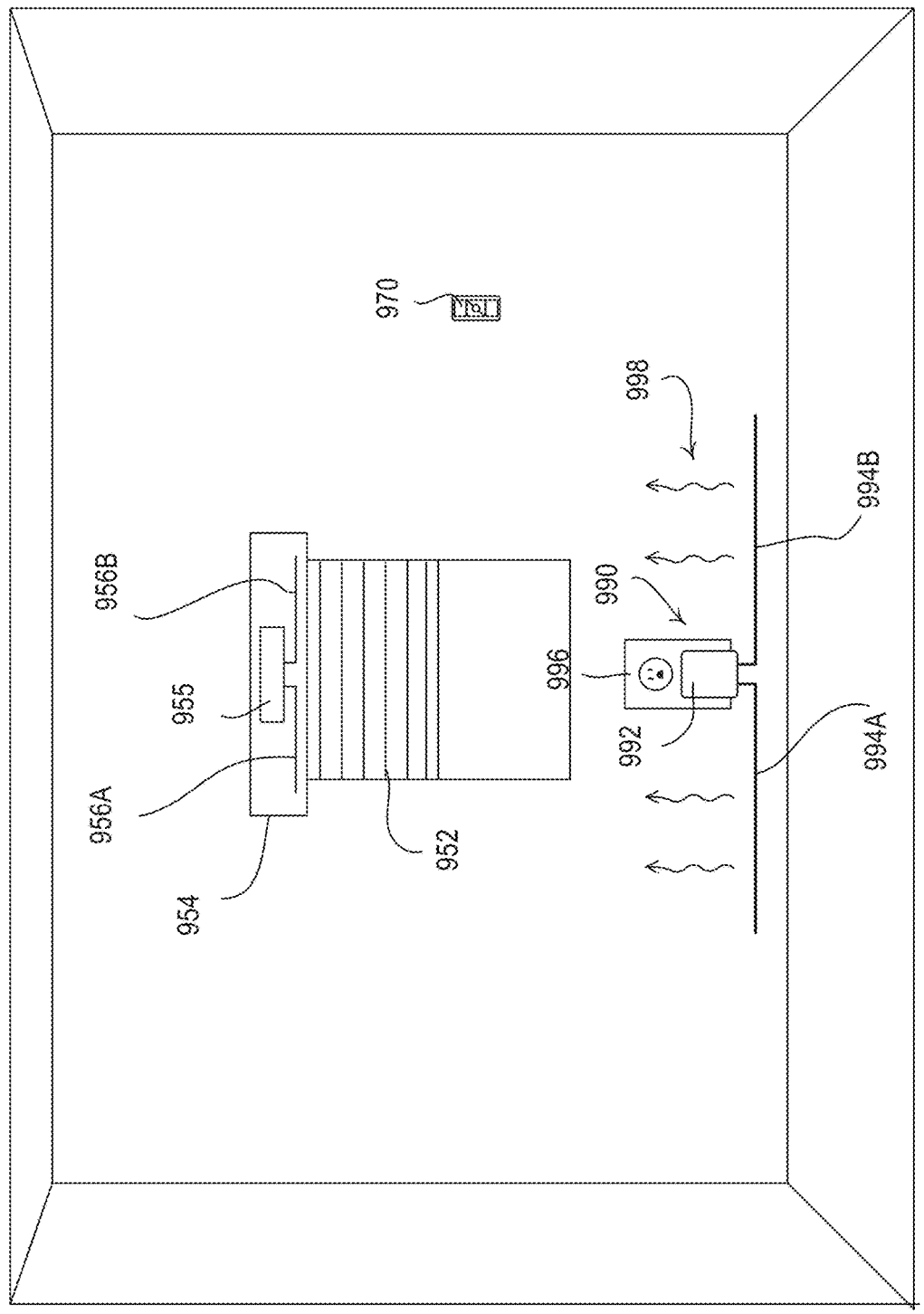
FIG. 9 shows an example user environment with a wireless power supply source for a motorized window treatment.

Although device 400 and 800 have been described as receiving power from a solar cell or PV module, other types of supplemental power sources may alternatively be used. For example, a wireless RF power source may be used as a supplemental power source. FIG. 9 shows an example user environment 900 with a wireless power supply source for powering a motorized window treatment 954 according to another embodiment. For example, the motorized window treatment 954 may include a motor drive unit, such as, for example, device 200. The motor drive unit of the motorized window treatment may have a supplemental power source which receives power wirelessly (i.e., via RF) to power the electrical load 225 (i.e., the control and communication circuits).

The wireless power supply may comprise a wireless power transmitting module 990 configured to wirelessly transmit power via RF signals 998 to wireless power receiving circuits inside of one or more control devices in the room including, for example, the motor drive unit of the motorized window treatment 954. The wireless power receiving circuits may be configured to harvest energy from the RF signals 998 transmitted by the wireless power transmitting module 990.

The wireless power transmitting module 990 may comprise a wireless power transmitting circuit (not shown) housed within an enclosure 992 and an antenna (e.g., a dipole antenna) having for example two transmitting antenna wires 994A, 994B that extend from the enclosure 992 and are coupled (e.g., electrically or magnetically coupled) to the wireless power transmitting circuit. The antenna may also be formed as a loop or helical antenna. The wireless power transmitting module 990 may comprise electrical prongs (not shown) that may be plugged into a standard electrical outlet 996 for powering the wireless power transmitting circuit from an AC power source. The transmitting antenna wires 994A, 994B may be positioned horizontally to extend in opposite directions, for example, along the floor at the bottom of a wall below the motorized window treatment 954. For example, the wireless power supply transmitting module 990 may be configured to continuously transmit power via RF signals 998 to the wireless power receiving circuits of the supplemental power supply of the motorized window treatment. In addition, the wireless power supply transmitting module 990 may be configured to transmit power in a periodic (e.g., a pulsed or pulse-width modulated) manner, for example, in bursts having a higher peak power for a shorter duration. If power is transmitted in a periodic matter, the frequency of the pulses can be adjusted with respect to time (e.g., swept), such that there is no specific channel (e.g., frequency) with which the wireless power supply transmitting module 990 is constantly interfering.

For example, the motorized window treatment 954 may include a motor drive unit 955. The motor drive unit 955 may comprise an internal wireless power receiving circuit that allows for powering a motor, an internal control circuit, and an internal wireless communication circuit (e.g., an RF transceiver) of the motor drive unit. The motor drive unit 955 may comprise an antenna (e.g., a dipole antenna) having two antenna wires 956A, 956B that extend from the motor drive unit 955 and are electrically coupled to the internal wireless power receiving circuit and that are tuned to receive RF signals 998. The antenna may also be formed as a loop or helical antenna. The motor drive unit may control the fabric or drapery 952 based on control instructions received from a control device 970.

Figure 10:
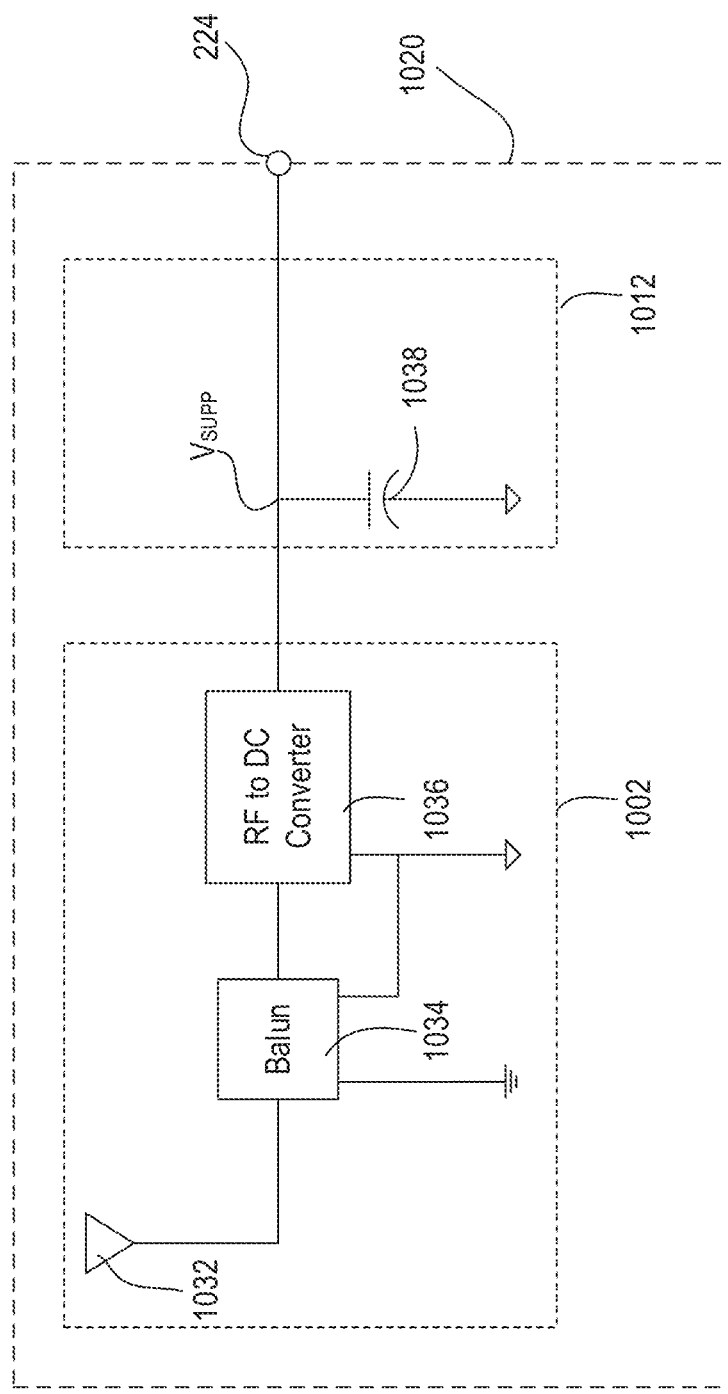
FIG. 10 shows an example supplemental power supply based on radio frequency (RF) signals.

FIG. 10 shows an example supplemental power supply 1020 according to a further embodiment. The supplemental power supply 1020 is an example of the supply that can be used in FIG. 9, and can be used in device 200 as the element 220. The supplemental power supply 1020 may include a supplemental power source 1002 and an energy storage device 1012. The supplemental power source may be a wireless power receiving circuit which may receive power from a wireless power supply source, such as wireless power transmitting module 990 of FIG. 9, located remotely from the wireless power receiving circuit. The wireless power receiving circuit may include an antenna 1032, e.g., an electric field (E-field) antenna, a balun circuit 1034, and a radiofrequency to direct current (RF-to-DC) converter circuit 1036. For example, the antenna 1032 may comprise a dipole antenna.

The energy storage device 1012 may include a capacitor, such as capacitor 1038 shown in FIG. 10. The capacitor may be a supercapacitor, or may be a tantalum, electrolytic, or other type of capacitor. Alternatively, the energy storage device may comprise an inductor, or other suitable energy storage device. The capacitor 1038 may store energy provided by the wireless power receiving circuit and may provide voltage $V_{SUPP}$ to the power converter circuit 216 of device 200 of FIG. 2. For example, the capacitor 1038 may have a capacitance of approximately 100 µF.

The antenna 1032 may capture (e.g., harvest) power from RF signals transmitted by a wireless power transmitting module (e.g., the RF signals 998 transmitted by the wireless power transmitting module 990). For example, the amount of power harvested by the antenna 1032 from the RF signals may be approximately 40 mW. The RF-to-DC converter circuit 1036 may operate to convert the energy from the RF signals to an un-regulated DC voltage across the storage capacitor 1038. The RF-to-DC converter circuit 1036 may have, for example, an efficiency of approximately 50%, such that the amount of power able to be delivered by the RF-to-DC converter circuit may be approximately 20 mW.

The power stored by the energy storage device, capacitor 1038, may provide a supply voltage $V_{SUPP}$. $V_{SUPP}$ may be supplied to the terminal 224 to provide power to the power converter circuit for powering the electrical load 225, as shown in FIG. 2.

Figure 11:
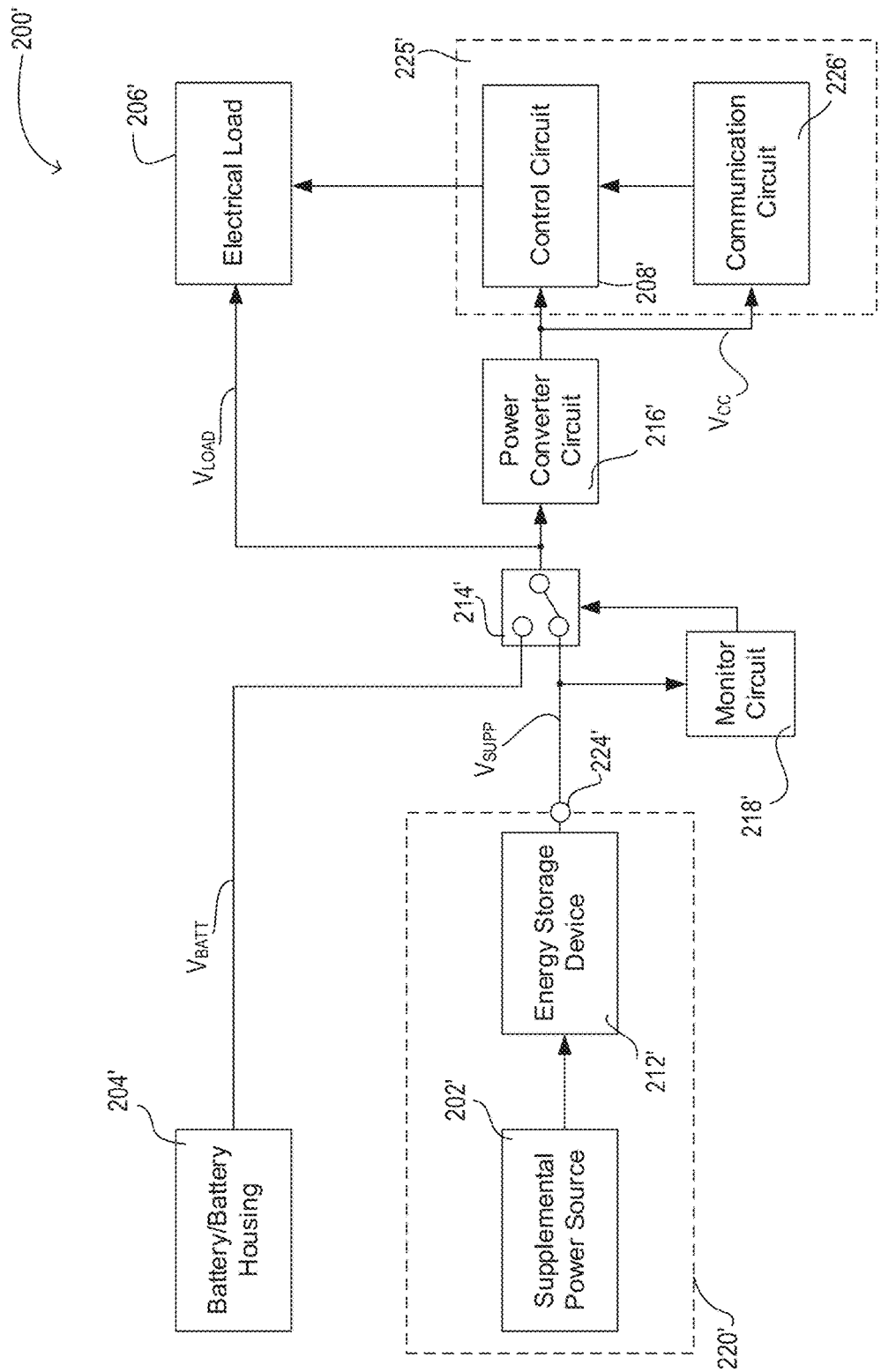
FIG. 11 shows a block diagram of an example device with a battery and supplemental power source according to an alternate embodiment.

FIG. 11 is an alternate embodiment of a device 200'. Similarly numbered components correspond to components as described in FIG. 2. For example, the battery 204' may be the same as battery 204 in FIG. 2. Here, both the electrical load 206' and the electrical load 225' of device 200' may be powered by either the battery 204' or the supplemental power supply 220' by means of the switch 214'. For example, the supplemental power supply may comprise one or more rechargeable batteries.

Figure 12:
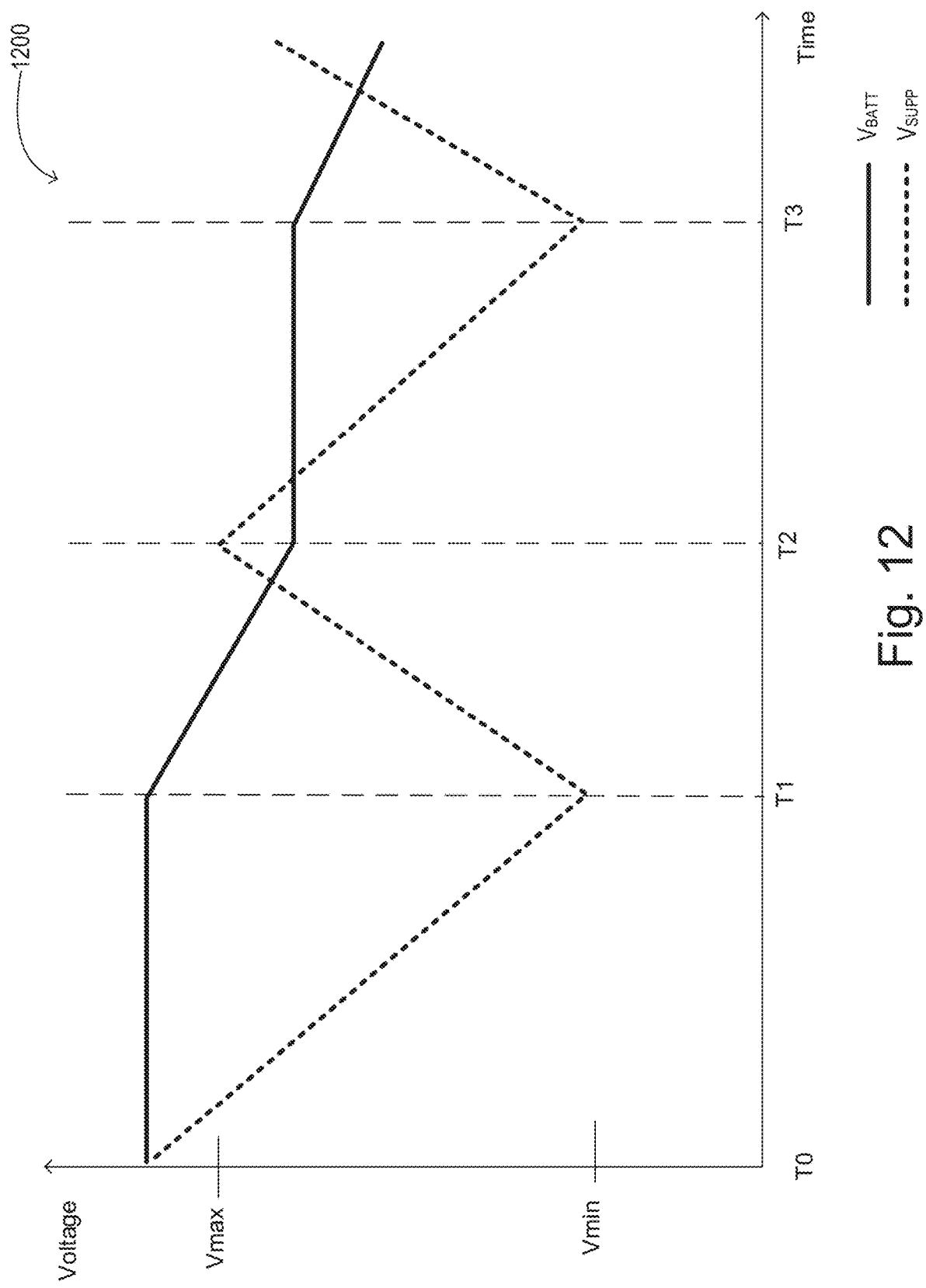
FIG. 12 is an example voltage profile over time of an energy storage device and a battery according to the embodiment described in FIG. 11.

FIG. 12 is an example voltage profile over time 1200 of a magnitude of a supply voltage $V_{SUPP}$ represented by the dashed line, and a magnitude of a battery voltage $V_{BATT}$ represented by the solid line. $V_{BATT}$ may correspond to the voltage on battery 204', and $V_{SUPP}$ may correspond to the voltage of the energy storage device 212', as shown in FIG. 11. For example, the energy storage device 212' may be a rechargeable battery and the battery 204' may be a primary (i.e., non-rechargeable) battery. At time T0, when the switch 214' is in the second position, the energy storage device 212' may provide power to the electrical load 206' and the electrical load 525'. As the energy storage device 212' provides power to the electrical loads, the energy storage device 212' may begin to discharge to the minimum voltage threshold, Vmin.

When the energy storage device 212' reaches the minimum voltage threshold Vmin at time T1, the monitor circuit 218' may detect that the voltage on the energy storage device 212' has reached the minimum threshold Vmin and may change the state of the switch 214' to the first position, thereby providing power to the electrical loads from the primary battery and allowing the energy storage device 212' to recharge. For example, the energy storage device 212' may be recharge via a solar cell, wireless power supply, etc., as previously described. At this time, the voltage of the primary cell may begin to decrease.

At time T2, the monitor circuit 218' may detect that the voltage on the energy storage device 212' has reached a maximum threshold Vmax. The monitor circuit may then change the state of the switch 214' to the second position, thereby providing power to the electrical loads from the energy storage device, which may further discharge. The process may repeat at time T3 when the energy storage device reaches the minimum threshold, and the monitor circuit again triggers the switch to provide power to the electrical loads via the primary battery 204'.

Although the embodiments described herein are specific to solar cells and wireless power supplies, one skilled in the art will readily recognize that other types of supplemental power sources or energy harvesters could be used. For example, other supplemental power sources may include: thermal energy harvesters, acoustic or vibrational energy harvesters, static electricity energy harvesters, and the like.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure.

What is claimed is:

1. A motorized window treatment power system, comprising:
    primary power system disposed at least partially within a motorized window treatment, the primary power system to provide a primary voltage;
    a supplemental power system that includes:
        a supplemental power source; and
        a first supplemental energy storage device coupled to the supplemental power source, the first supplemental energy storage device to provide a first supplemental voltage;
    first switching circuitry disposed at least partially within the motorized window treatment, the first switching circuitry to receive the primary voltage and the first supplemental voltage and provide, at an output connection, one of: the primary voltage or the first supplemental voltage, wherein the first switching circuitry to:
        output the primary voltage in a first position; or
        output the first supplemental voltage in a second position;
    first monitor circuitry operatively coupled to the first switching circuitry and disposed at least partially within the motorized window treatment, the first monitor circuitry to measure the first supplemental voltage, the first monitor circuitry including clamp and latch circuitry to:
        responsive to a measured first supplemental voltage less than a first minimum voltage threshold, cause the first switching circuitry to transition to the first position;
        responsive to a measured first supplemental voltage greater than a first maximum voltage threshold:
            cause the first switching circuitry to transition to the second position; and
            cause the clamp and latch circuitry to maintain the first supplemental voltage to operatively coupled control circuitry above the first minimum threshold voltage and below the first maximum voltage threshold.

2. The motorized window treatment power system of claim 1 wherein the supplemental power source comprises a photovoltaic energy collection system.

3. The motorized window treatment system of claim 1 wherein the supplemental power source comprises a wireless radio frequency (RF) energy transfer system.

4. The motorized window treatment power system of claim 1 wherein the first supplemental energy storage device comprises a capacitive energy storage device.

5. The motorized window treatment system of claim 1 wherein the first supplemental energy storage device comprises a rechargeable battery.

6. The motorized window treatment system of claim 1 wherein the primary power system is disposed within a venetian blind headrail.

7. The motorized window treatment system of claim 1 wherein the primary power system is disposed within a shade roller tube.

8. The motorized window treatment system of claim 1 wherein the first switching circuitry comprises a semiconductor device.

9. The motorized window treatment system of claim 1, further comprising:
    first power converter circuitry coupled the output connection of the first switching circuitry.

10. The motorized window treatment system of claim 9, further comprising:
    control circuitry coupled to the first power converter circuitry, the control circuitry to receive power from the first power converter circuitry.

11. The motorized window treatment system of claim 10 wherein the control circuitry further comprises communication circuitry.

12. The motorized window treatment system of claim 11 wherein the communication circuitry comprises circuitry reversibly transitionable between a relatively lower power sleep state and a relatively higher power active state.

13. The motorized window treatment system of claim 1 wherein the supplemental power system further comprises:
    a second supplemental energy storage device to provide a second supplemental voltage;
    second switching circuitry disposed at least partially within the motorized window treatment, the second switching circuitry to receive the supplemental voltage from the supplemental power source, the second switching circuitry to:
        output the supplemental voltage to the second supplemental energy storage device in a first position; or
        output the supplemental voltage to the first supplemental storage device in a second position;
    wherein the first monitor circuitry to further:
        responsive to a measured first supplemental voltage greater than an intermediate voltage threshold, cause the second switching circuitry to transition to the first position;
            wherein the intermediate threshold voltage is greater than the first minimum threshold voltage and less than the first maximum threshold voltage; and
        responsive to a measured first supplemental voltage less than the first minimum threshold voltage, cause the second switching circuitry to transition to the second position.

14. The motorized window treatment system of claim 13, wherein the supplemental power system further comprises:
    second monitor circuitry disposed at least partially within the motorized window treatment, to:
        measure the second supplemental voltage;
        responsive to a measured second supplemental voltage at or above a second maximum voltage threshold activate an operatively coupled second power converter circuitry; or
        responsive to a measured second supplemental voltage at or below a second minimum voltage threshold, deactivate the operatively coupled second power converter circuitry.

15. The motorized window treatment power system of claim 13 wherein the second supplemental energy storage device comprises a capacitive energy storage device.

16. The motorized window treatment system of claim 13 wherein the second supplemental energy storage device comprises a rechargeable battery.

17. The motorized window treatment system of claim 13 wherein the second switching circuitry comprises a semiconductor device.

18. The motorized window treatment system of claim 13, further comprising:
   second power converter circuitry operatively coupled to the second supplemental energy storage device.

\* \* \* \* \*